(12) United States Patent
Minami et al.

(10) Patent No.: US 10,686,979 B2
(45) Date of Patent: Jun. 16, 2020

(54) CONTROL APPARATUS AND CONTROL METHOD

(71) Applicant: SONY CORPORATION, Tokyo (JP)

(72) Inventors: Tomoyuki Minami, Tokyo (JP); Shunsuke Yajima, Kanagawa (JP); Yoshitaka Miyatani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/069,775

(22) PCT Filed: Feb. 1, 2017

(86) PCT No.: PCT/JP2017/003537
§ 371 (c)(1),
(2) Date: Jul. 12, 2018

(87) PCT Pub. No.: WO2017/135276
PCT Pub. Date: Aug. 10, 2017

(65) Prior Publication Data
US 2019/0028653 A1   Jan. 24, 2019

(30) Foreign Application Priority Data

Feb. 1, 2016   (JP) ................................. 2016-017065

(51) Int. Cl.
*H04N 5/232* (2006.01)
*G02B 7/28* (2006.01)
*G02B 7/34* (2006.01)
*G03B 13/36* (2006.01)

(52) U.S. Cl.
CPC ......... *H04N 5/232127* (2018.08); *G02B 7/28* (2013.01); *G02B 7/34* (2013.01); *H04N 5/232* (2013.01); *H04N 5/23216* (2013.01); *H04N 5/232122* (2018.08); *H04N 5/232945* (2018.08); *G03B 13/36* (2013.01)

(58) Field of Classification Search
None
See application file for complete search history.

(56) References Cited

U.S. PATENT DOCUMENTS

| 2001/0022626 A1 | 9/2001 | Nozaki |
| 2002/0057908 A1* | 5/2002 | Otani ..................... G03B 13/02 396/51 |
| 2006/0139478 A1 | 6/2006 | Nozaki |

(Continued)

FOREIGN PATENT DOCUMENTS

| CN | 103988490 A | 8/2014 |
| EP | 2793457 A1 | 10/2014 |

(Continued)

OTHER PUBLICATIONS

International Search Report and Written Opinion of PCT Application No. PCT/JP2017/003537, dated May 9, 2017, 16 pages of ISRWO.

*Primary Examiner* — Mark T Monk
(74) *Attorney, Agent, or Firm* — Chip Law Group

(57) ABSTRACT

Provided is a control apparatus including a focus detection control unit that sets a density of a focus detection point in a partial region specified, to be higher than a density of a focus detection point in a region excluding the partial region which corresponds to a position of an identified subject or a region specified by a user.

18 Claims, 22 Drawing Sheets

(56) References Cited

U.S. PATENT DOCUMENTS

| | | |
|---|---|---|
| 2011/0037890 A1 | 2/2011 | Nozaki |
| 2014/0334683 A1 | 11/2014 | Masuda |
| 2015/0109515 A1 | 4/2015 | Kobuse |
| 2015/0256737 A1 | 9/2015 | Saito |

FOREIGN PATENT DOCUMENTS

| | | |
|---|---|---|
| JP | 06-3581 A | 1/1994 |
| JP | 2000-155261 A | 6/2000 |
| JP | 2001-208961 A | 8/2001 |
| JP | 2003-259163 A | 9/2003 |
| JP | 2010-072284 A | 4/2010 |
| JP | 2011-90048 A | 5/2011 |
| JP | 2011-176457 A | 9/2011 |
| JP | 2012-18014 A | 1/2012 |
| JP | 2012-128343 A | 7/2012 |
| JP | 2013-122494 A | 6/2013 |
| JP | 2014-013398 A | 6/2013 |
| JP | 2014-137567 A | 7/2014 |
| JP | 2015-079162 A | 4/2015 |
| JP | 2015-106116 A | 6/2015 |
| JP | 2015-169708 A | 9/2015 |
| WO | 2013/088917 A1 | 6/2013 |

* cited by examiner

FIG. 2

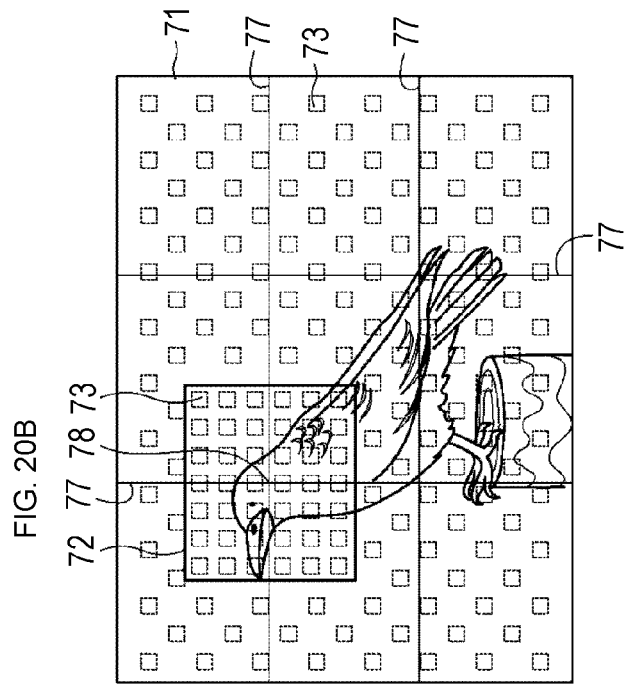
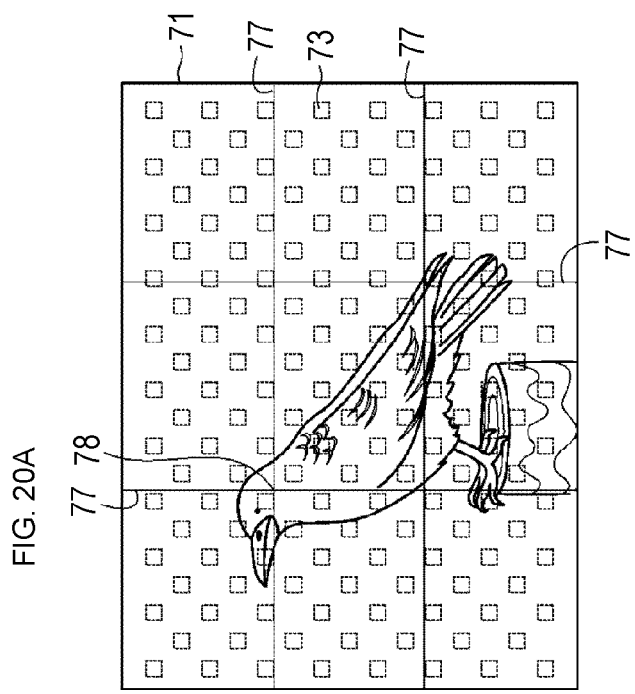

CONTROL APPARATUS AND CONTROL METHOD

CROSS REFERENCE TO RELATED APPLICATIONS

This application is a U.S. National Phase of International Patent Application No. PCT/JP2017/003537 filed on Feb. 1, 2017, which claims priority benefit of Japanese Patent Application No. JP 2016-017065 filed in the Japan Patent Office on Feb. 1, 2016. Each of the above-referenced applications is hereby incorporated herein by reference in its entirety.

TECHNICAL FIELD

The present technology relates to a control apparatus, a control method, and a control program.

BACKGROUND ART

Conventionally, an image pickup device having a part of pixels constituting the image pickup device as focus detection pixels has been known (Patent Document 1). Autofocus implemented by such an image pickup device is referred to so-called image plane phase difference autofocus (AF) or the like.

One of the features of the image pickup device for such image plane phase difference AF is that pixels for AF detection are uniformly embedded in the entire surface or a predetermined range of the image pickup device.

CITATION LIST

Patent Document

Patent Document 1: Japanese Patent Application Laid-Open No. 2015-144194

SUMMARY OF THE INVENTION

Problems to be Solved by the Invention

However, conventionally, a position of a focusing target range by autofocus is fixed, which is displayed on a display unit of an imaging apparatus, and only a part of focus detection pixels has been used. In addition, a problem of arrangement of the focusing target range in the related art is that, for example, in a case where a subject to be focused is small or the subject to be focused is moving, if the focusing target range does not appropriately cover the subject, accuracy of autofocus decreases.

The present technology has been made in view of such a problem, and it is an object thereof to provide a control apparatus, a control method, and a control program capable of improving the accuracy of autofocus.

Solutions to Problems

In order to solve the problem described above, a first technology is a control apparatus including a focus detection control unit that sets a density of a focus detection point in a partial region specified, to be higher than a density of a focus detection point in a region excluding the partial region.

In addition, a second technology is a control method for setting a density of a focus detection point in a partial region specified, to be higher than a density of a focus detection point in a region excluding the partial region.

Further, a third technology is a control program for causing a computer to execute a control method, the control method for setting a density of a focus detection point in a partial region specified, to be higher than a density of a focus detection point in a region excluding the partial region.

Effects of the Invention

According to the present technology, the accuracy of autofocus can be improved. Note that, the effect described here is not necessarily limited, and can be any effect described in the present description.

BRIEF DESCRIPTION OF DRAWINGS

FIG. 2 is a diagram illustrating a configuration of an image pickup device.

FIGS. 20A and 20B are diagrams for explaining a third aspect in the third embodiment.

MODE FOR CARRYING OUT THE INVENTION

Hereinafter, embodiments of the present technology will be described with reference to the drawings. Note that, description will be made in the following order.
1. First embodiment
1-1. Configuration of imaging apparatus
1-2. First aspect of focus detection point arrangement
1-3. Second aspect of focus detection point arrangement
1-4. Third aspect of focus detection point arrangement
2. Second embodiment
2-1. Configuration of imaging apparatus
2-2. Aspect of focus detection point arrangement
3. Third embodiment
3-1. Configuration of imaging apparatus
3-2. First aspect of focus detection point arrangement
3-3. Second aspect of focus detection point arrangement
3-4. Third aspect of focus detection point arrangement
4. Modification

1. First Embodiment 1-1. Configuration of Imaging Apparatus

Figure 1:
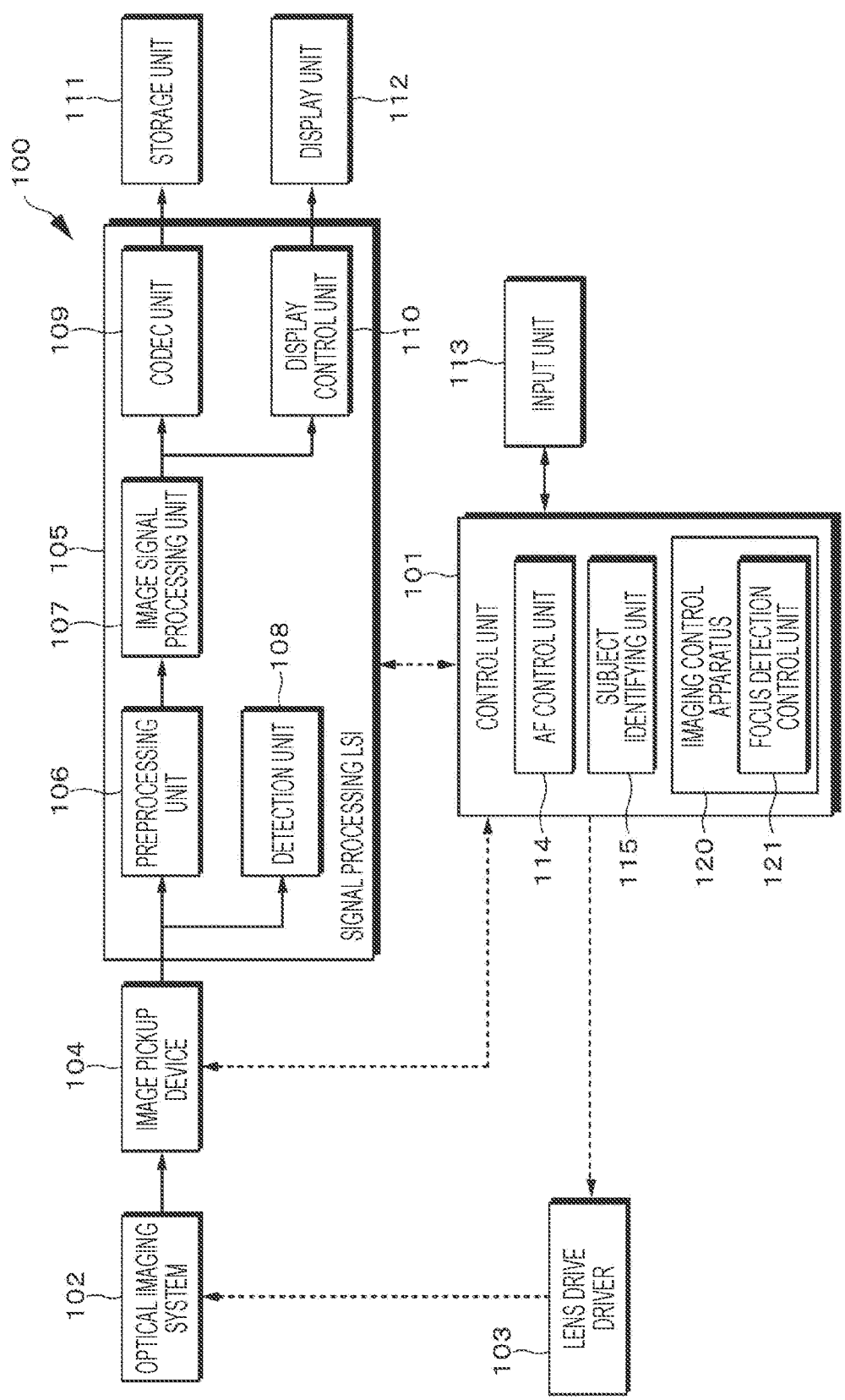
FIG. 1 is a block diagram illustrating a configuration of an imaging apparatus including an imaging control apparatus according to a first embodiment of the present technology.

First, a configuration will be described of an imaging apparatus 100 having a function of an imaging control apparatus 120 according to a first embodiment. FIG. 1 is a block diagram illustrating a configuration of the imaging apparatus 100.

The imaging apparatus 100 includes a control unit 101, an optical imaging system 102, a lens drive driver 103, an image pickup device 104, a signal processing Large-Scale Integration (LSI) 105, a preprocessing unit 106, an image signal processing unit 107, a detection unit 108, a codec unit 109, a display control unit 110, a storage unit 111, a display unit 112, an input unit 113, an AF control unit 114, a subject identifying unit 115, and a focus detection control unit 121 constituting the imaging control apparatus 120.

The control unit 101 includes a Central Processing Unit (CPU), Random Access Memory (RAM), Read Only Memory (ROM), and the like. In the ROM, a program read and operated by the CPU, and the like are stored. The RAM is used as work memory of the CPU. The CPU executes various types of processing in accordance with the program stored in the ROM and issues commands to control the entire imaging apparatus 100.

In addition, by executing a predetermined program, the control unit 101 functions as the AF control unit 114, the subject identifying unit 115, and the focus detection control unit 121 constituting the imaging control apparatus 120. The program may be installed in the imaging apparatus 100 in advance, or may be distributed by downloading, storage medium, or the like, and installed by a user oneself. In addition, configurations of those may be implemented not only by the program but also by combining dedicated hardware apparatuses, circuits, and the like having respective functions.

The subject identifying unit 115 identifies a subject that is a target of arrangement of focus detection points within a photographing range. The focus detection control unit 121 performs processing of locally arranging the focus detection point densely within a partial region that is a region corresponding to the subject within the photographing range than in an outer region other than the partial region, on the basis of a position of the subject identified by the subject identifying unit 115. In other words, it can also be said that setting is performed such that a density of the focus detection points in a partial region specified is arranged to be higher than a density of the focus detection points in a region (outer region) excluding the partial region. Here, "density is arranged to be higher" means that a distance between the centers of a plurality of focal points arranged within the partial region is shorter than a distance between the centers of a plurality of the focus detection points arranged in the region (outer region) excluding the partial region. In addition, the focus detection control unit 121 performs processing of arranging the focus detection points more sparsely in the outer region than in the partial region. Further, the focus detection control unit 121 may also perform processing of preventing the focus detection points from being arranged in the outer region. Details of the subject identifying unit 115 and the focus detection control unit 121 will be described later.

The photographing range is a range that falls within a photographing angle of view of the imaging apparatus 100 and is a range of the subject acquired as image data.

The partial region is a region corresponding to the position of the identified subject, or a region specified by the user, and a range smaller than the photographing range including a subject, a position, and the like that are targets of the local arrangement of the focus detection points within the photographing range. The outer region is all regions other than the partial region within the photographing range. The focus detection points each are a region for which the defocus amount is calculated in the photographing range, for autofocus by using an output of a phase difference detection pixel. "Arranging the focus detection points densely" means to arrange the focus detection points such that an interval between the plurality of focus detection points within the partial region is narrower than an interval between the plurality of focus detection points in the outer region to make the focus detection points dense, or to arrange the focus detection points only within the partial region without arranging the focus detection points in the outer region. "Arranging the focus detection points sparsely" means to arrange the focus detection points such that the interval between the plurality of focus detection points within the outer region is wider than the interval between the plurality of focus detection points in the partial region.

The optical imaging system 102 includes a photographing lens for focusing light from the subject on the image pickup device 104, a drive mechanism for moving the photographing lens to perform focusing and zooming, a shutter mechanism, an iris mechanism, and the like. These are driven on the basis of a control signal from the control unit 101. An optical image of the subject obtained through the optical imaging system 102 is formed on the image pickup device 104 as an imaging device.

The lens drive driver 103 includes a microprocessor, for example, and performs autofocus so that a lens is moved by a predetermined amount along an optical axis direction under the control of the AF control unit 114 to be focused on a subject that is an object. In addition, under the control of the control unit 101, motions of the drive mechanism, shutter mechanism, iris mechanism, and the like of the optical imaging system 102 are controlled. As a result, adjustment of exposure time (shutter speed), adjustment of aperture value (F value), and the like are performed.

Figure 2:
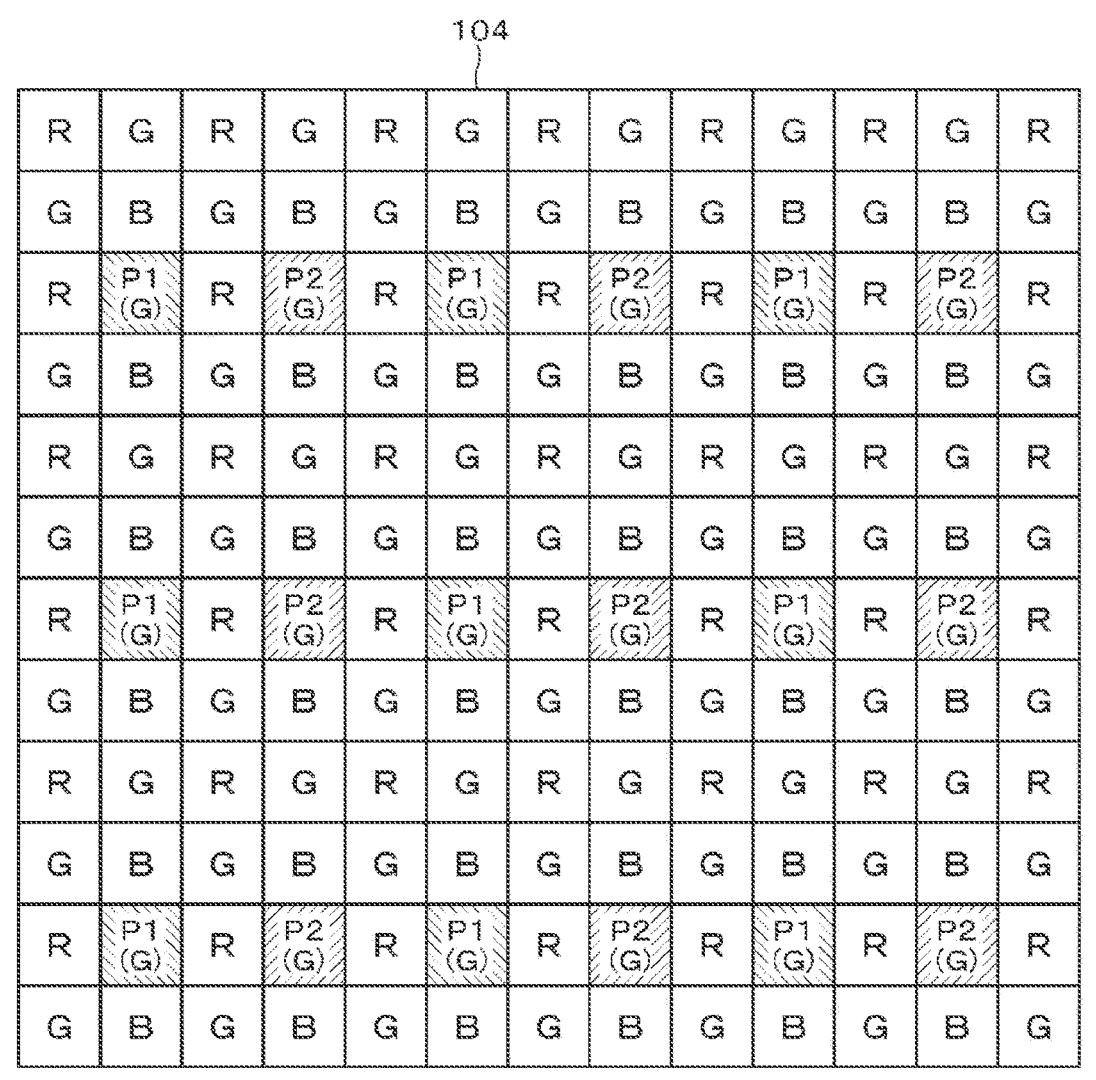

As illustrated in FIG. 2, the image pickup device 104 includes a Red (R) pixel, a Green (G) pixel, and a Blue (B) pixel that are normal pixels, a first phase difference detection pixel P1, and a second phase difference detection pixel P2. A pair of the phase difference detection pixels is formed by P1 and P2. The phase difference detection pixels P1 and P2 have different optical characteristics from the normal imaging pixels. Each pixel constituting the image pickup device 104 photoelectrically converts incident light from the subject and converts the incident light into a charge amount to output a pixel signal. Then, the image pickup device 104 finally outputs an imaging signal including pixel signals to the signal processing LSI 105. As the image pickup device 104, Charge Coupled Device (CCD), Complementary Metal Oxide Semiconductor (CMOS), or the like is used. Note that, the image pickup device 104 corresponds to an imaging unit in CLAIMS.

Figure 3B:
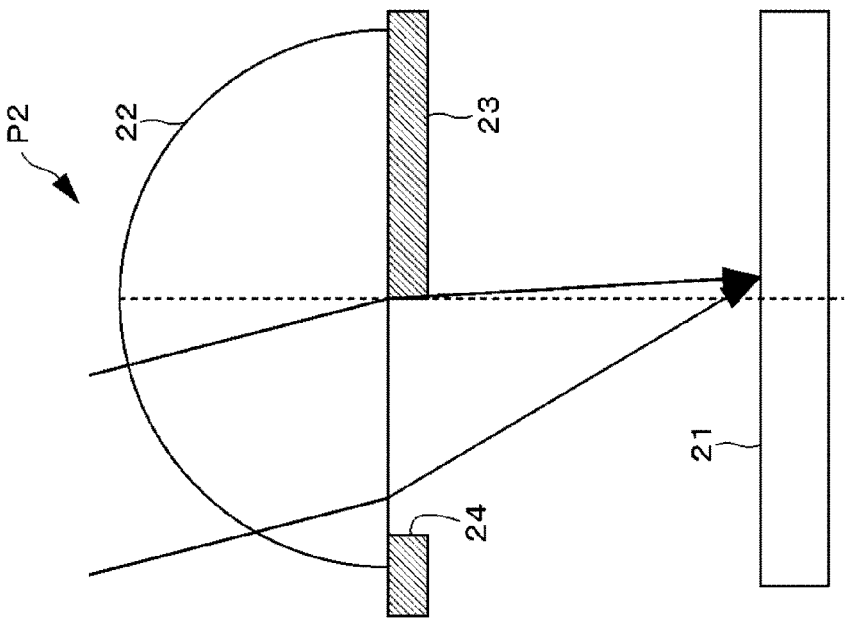
FIG. 3B is a diagram illustrating a configuration of a second phase difference detection pixel.
Figure 3A:
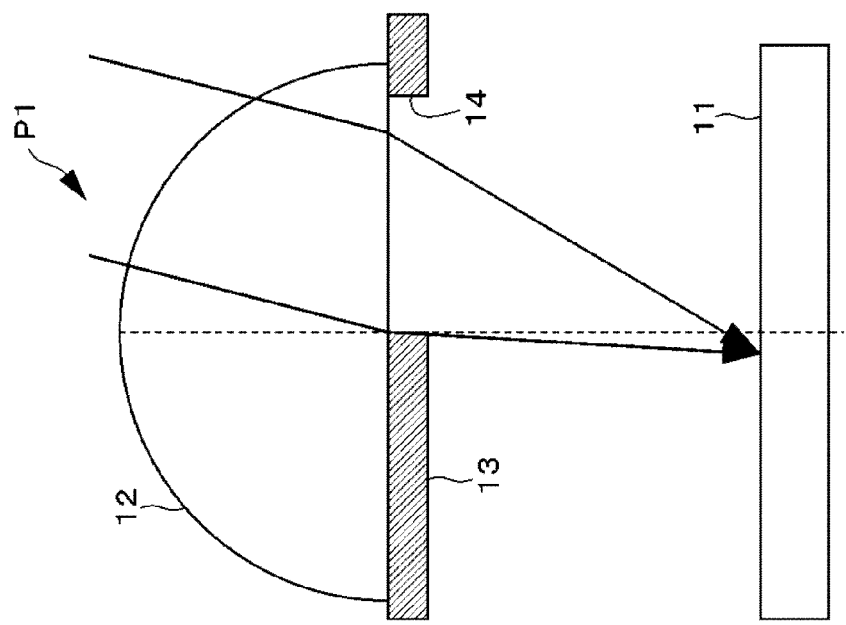
FIG. 3A is a diagram illustrating a configuration of a first phase difference detection pixel.

FIGS. 3A and 3B are diagrams illustrating a configuration of the phase difference detection pixel. FIG. 3A illustrates the first phase difference detection pixel P1, and FIG. 3B illustrates the second phase difference detection pixel P2.

The first phase difference detection pixel P1 includes a light receiving device 11. In addition. A microlens 12 is provided on the light incident side. Further, a light shielding layer 13 for blocking the incident light is provided between the light receiving device 11 and the microlens 12, in order to perform pupil division. The light shielding layer 13 includes an opening 14 eccentric in one direction with respect to the center of the light receiving device 11.

Since the first phase difference detection pixel P1 is configured as described above, only a part of the incident light is incident on the light receiving device 11 as illustrated in FIG. 3A.

The second phase difference detection pixel includes a light receiving device 21. In addition. A microlens 22 is provided on the light incident side. Further, a light shielding layer 23 for blocking the incident light is provided between the light receiving device 21 and the microlens 22, in order to perform pupil division. The light shielding layer 23 includes an opening 24 eccentric in one direction with respect to the center of the light receiving device.

The light shielding layer 23 is configured to block the opposite side of the layer from the direction blocked by the light shielding layer 13 in the first phase difference detection pixel P1. Accordingly, the first phase difference detection pixel P1 and the second phase difference detection pixel P2 are configured to respectively shield the opposite sides with respect to a distance measuring direction.

Since the second phase difference detection pixel P2 is configured as described above, only a part of the incident light is incident on the light receiving device 21 as illustrated in FIG. 3B.

The phase difference detection pixel is configured as described above, and so-called image plane phase difference autofocus (AF) can be performed by using the output from the phase difference detection pixel. Note that, the phase difference detection pixel may function as only a phase difference detection pixel and not as a normal pixel, or may function as a pixel for imaging and phase difference detection due to a configuration in which one pixel includes two independent photodiodes. In such a pixel, two photodiodes can capture light independently of each other, and during autofocusing, the pixel detects a phase difference signal from each photodiode and functions as a phase difference detection pixel, and at the time of photographing, the pixel functions as one normal pixel and outputs an image signal.

In addition, any image pickup device 104 may be used, such as the image pickup device 104 having a structure in which an imaging sensor and an image plane phase difference AF sensor are stacked, as long as the device can perform phase difference detection in addition to a normal photographing function.

The preprocessing unit 106 performs sample-hold and the like for the imaging signal output from the image pickup device 104 so as to maintain satisfactory Signal/Noise (S/N) ratio by Correlated Double Sampling (CDS) processing. Further, the gain is controlled by Auto Gain Control (AGC) processing and Analog/Digital (A/D) conversion is performed to output a digital image signal.

The image signal processing unit 107 performs, to the image signal, predetermined signal processing such as demosaic processing, white balance adjustment processing, color correction processing, gamma correction processing, Y/C conversion processing, Auto Exposure (AE) processing, or resolution conversion processing.

The detection unit 108 executes AF detection for determining a focus position by using the signal from the phase difference detection pixel of the image pickup device 104 and calculates the defocus amount. Detection information is supplied to the control unit 101 or the AF control unit 114 by the detection unit 108.

Note that, a signal from the normal pixel and a signal from the phase difference detection pixel are both supplied from the image pickup device 104 to the signal processing LSI 105 and are divided into the signal from the normal pixel and the signal from the phase difference detection pixel in the signal processing LSI 105. The signal from the normal pixel is subjected to predetermined image processing by the above-described target subject and the image signal processing unit 107, and the signal from the phase difference detection pixel is subjected to detection processing for autofocus by the detection unit 108. In addition, there is an image pickup device enabled to select only the signal from the phase difference detection pixel and independently supply the signal to the signal processing LSI 105, and such an image pickup device may be used.

Note that, it is also possible to perform the detection processing to the signal from the phase difference detection pixel in the image pickup device 104 and output the signal from the normal pixel and the detection information from the image pickup device 104 to the signal processing LSI 105. In this case, it is unnecessary to divide the signal from the image pickup device 104 into the signal from the normal pixel and the signal from the phase difference detection pixel in the signal processing LSI 105. A camera or the like included in a mobile phone may be configured as described above.

The codec unit 109 performs encoding processing for recording or communication, for example, on the image data subjected to the predetermined processing.

The display control unit 110 performs control to display, on the display unit 112, a monitoring image for displaying a subject as a moving image during photographing, various user interfaces for photographing, a captured image, a moving image, and the like. In addition, the display control unit 110 acquires focus detection point information from the focus detection control unit 121, and superimposes and displays a frame-like icon indicating the focus detection point on the monitoring image on the display unit 112. As a result, the user can visually confirm on which subject and how the focus detection points are arranged. Note that, the focus detection points are not necessarily displayed on the monitoring image, and the user may select on/off of displaying the focus detection points.

Figure 4A:
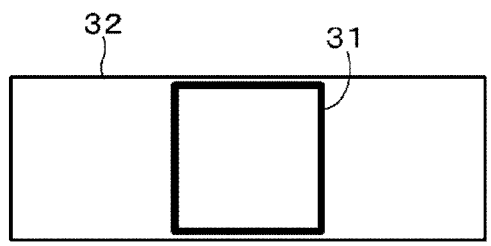
FIGS. 4A, 4B, and 4C are explanatory diagrams of phase difference detection pixels and focus detection points.

Here, with reference to FIGS. 4A, 4B, and 4C, a relationship will be described between the focus detection points as a region that is a target of defocus amount calculation and the phase difference detection pixel provided in the image pickup device 104. FIG. 4A extracts and illustrates one focus detection point 31 in the photographing range and a region (hereinafter referred to as a phase difference pixel region 32) used for detection by the phase difference detection pixel corresponding the focus detection point 31. The phase difference pixel region 32 includes a plurality of pairs of phase difference detection pixels described with reference to FIG. 2. The defocus amount is calculated for each focus detection point corresponding to the phase difference pixel region. As illustrated in FIG. 4A, the shape and size of the focus detection point 31 indicated by a bold line are not the same as the shape and size of the phase difference pixel region 32 indicated by a thin line corresponding to the focus detection point 31, and normally, the phase difference pixel region 32 is wider than the focus detection point 31.

Figure 4B:
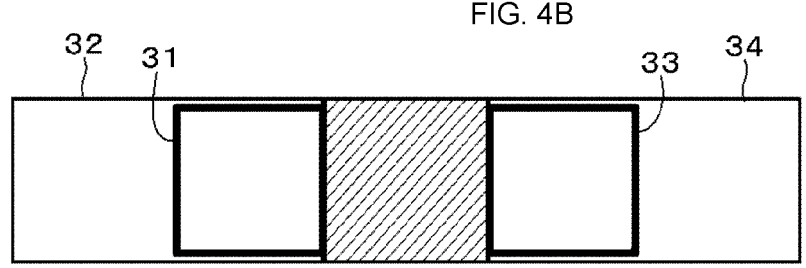
Figure 4C:
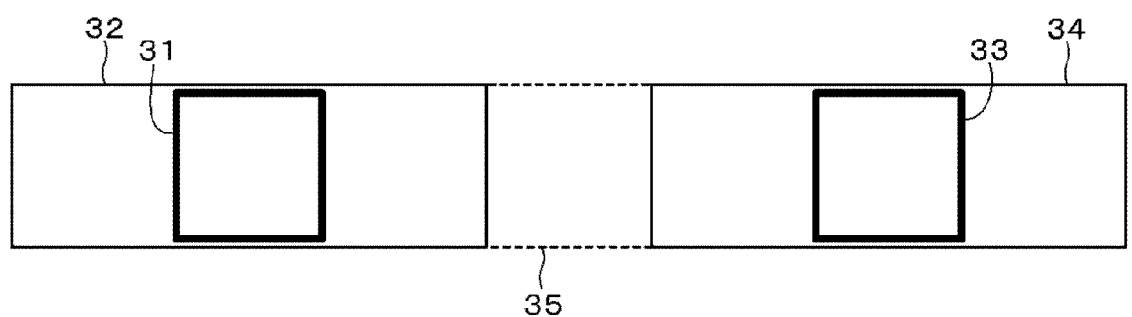

Therefore, as illustrated in FIG. 4B, even in a case where a plurality of focus detection points 31 and 33 is arranged sparsely at an interval, phase difference pixel regions 32 and 34 of the respective plurality of focus detection points 31 and 33 may overlap each other (hatched portion in FIG. 4B). Accordingly, even in a case where the plurality of focus detection points is arranged sparsely at an interval, all the phase difference detection pixels may be used. Note that, in a case where the plurality of focus detection points 31 and 33 is sparsely arranged at a large interval, and the phase difference pixel regions 32 and 34 corresponding to the respective focus detection points 31 and 33 do not overlap each other, as illustrated in FIG. 4C, operation is stopped of a phase difference detection pixel corresponding to a phase difference pixel region 35 (broken line portion in FIG. 4C) that is not used for detection.

In addition, by changing the focus detection point and the phase difference pixel region corresponding to the focus detection point, it is possible to arrange the focus detection point at an arbitrary position within the photographing range. The focus detection point is conceptual, and the defocus amount at the focus detection point is calculated on the basis of signals from the plurality of pairs of phase difference detection pixels included in the focus detection region. Since the plurality of pairs of phase difference detection pixels are included symmetrically with respect to a line of the focus detection region, substantially, the defocus amount at the center of the focus detection region is calculated.

Referring back to the block diagram of FIG. 1, the description will be continued. The display unit 112 is a display device including, for example, a liquid crystal display (LCD), a plasma display panel (PDP), or an organic electro luminescence (EL) panel. On the display unit 112, a user interface of the imaging apparatus 100, a menu screen, a monitoring image during imaging, a captured image recorded in the storage unit 111, a captured moving image, and the like are displayed.

The storage unit 111 is, for example, a mass storage medium such as a hard disk, a memory stick (registered trademark of Sony Corporation), or an SD memory card. The image is stored in a compressed state on the basis of a standard such as Joint Photographic Experts Group (JPEG). In addition, Exchangeable Image File Format (EXIF) data including information regarding the image stored and additional information such as imaging date and time is also stored in association with the image. The moving image is stored in a format such as Moving Picture Experts Group 2 (MPEG2), or MPEG4.

The input unit 113 includes, for example, a power button for switching power on/off, a release button for instructing a start of recording of a captured image, an operator for zoom adjustment, and a touch screen integrally formed with the display unit 112. When an input is made to the input unit 113, a control signal corresponding to the input is generated and output to the control unit 101. Then, the control unit 101 performs calculation processing and control corresponding to the control signal.

The AF control unit 114 controls the lens drive driver 103 by using the output of the focus detection pixel corresponding to the focus detection point, on the basis of the focus detection point information from the focus detection control unit 121. By controlling the lens drive driver 103, the lens is moved by a predetermined amount along the optical axis direction, and autofocus control is performed so that the lens is focused on the subject. Specifically, the imaging plane phase difference AF is performed on the basis of a shift amount of a pair of images formed on the focus detection pixels by light flux passing through a pair of pupil regions of an imaging optical system. Accordingly, the focus detection point information is supplied from the focus detection control unit 121 to the AF control unit 114.

The subject identifying unit 115 performs processing of identifying a subject, a position, and the like that are targets of focus detection point arrangement. A frame image constituting the monitoring image (hereinafter referred to as an image to be processed) is input to the subject identifying unit 115, as an image to be processed. The subject identifying unit 115 detects a subject such as a person or an object in the image to be processed, using a known subject detection technology. Then, the subject detected is set as a subject that is the target of the focus detection point arrangement (hereinafter referred to as a target subject). Target subject information is supplied to the focus detection control unit 121.

Note that, as a subject detection method, it is possible to use a face/object recognition technology based on template matching, a matching method based on luminance distribution information of a subject, a method based on a feature amount or the like of a skin color portion or a human face included in an image, or the like. In addition, these methods may be combined to improve detection accuracy.

In addition, the subject identifying unit 115 may identify the subject (target subject) that is the target of the focus detection point arrangement in accordance with the input from the user to the input unit 113. For example, in a case where the display unit 112 of the imaging apparatus 100 functions as a touch screen as the input unit 113, a subject at a position where a user touches with a finger, a stylus pen, or the like in a monitoring image displayed on the display unit 112 is set as a target subject. In addition, in a case where the user can move a cursor superimposed and displayed on the monitoring image by operating a cross key, a dial, or the like of the input unit 113 of the imaging apparatus 100, a subject at a position of the cursor is set as a target subject.

The focus detection control unit 121 determines the arrangement of the focus detection points on the photographing screen displayed on the display unit 112 on the basis of the target subject information supplied. In the image pickup device 104 for the image plane phase difference AF, normally, the phase difference detection pixels are arranged on the entire surface of the image pickup device 104, and the focus detection points can be arranged at arbitrary positions in the photographing range. The present technology makes use of the features of the image pickup device 104 for the image plane phase difference AF and improves accuracy of autofocus with respect to the target subject by arranging the focus detection points in accordance with the target subject. Information indicating the arrangement of the focus detection points that have been set (hereinafter referred to as focus detection point information) is supplied to the display control unit 110 and the AF control unit 114. The specific arrangement of the focus detection points will be described later.

The imaging apparatus 100 having the function of the imaging control apparatus 120 is configured as described above.

1-2. First Aspect of Focus Detection Point Arrangement

Figure 5B:
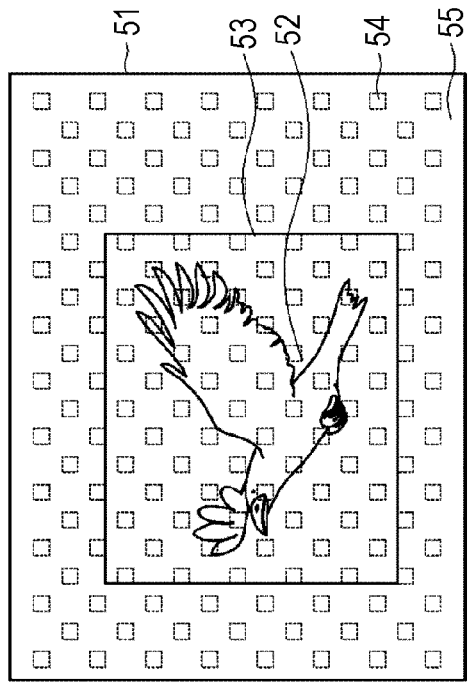
FIGS. 5A, 5B, and 5C are diagrams for explaining a first aspect in the first embodiment.
Figure 5A:
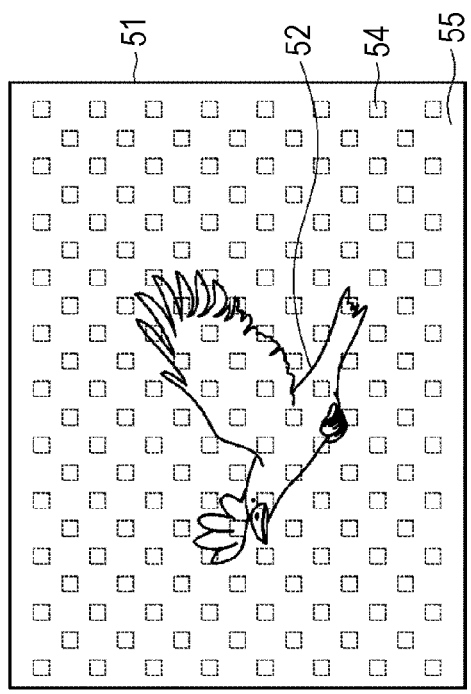
Figure 5C:
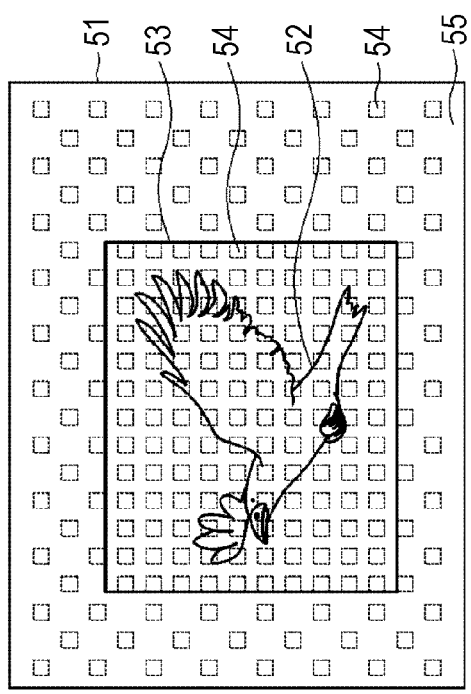
Figure 6:
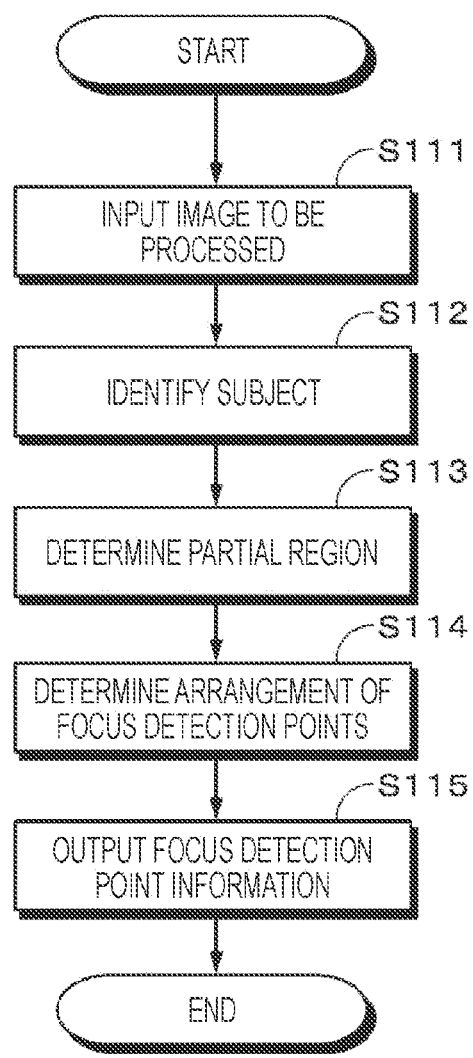
FIG. 6 is a flowchart illustrating processing of the first aspect in the first embodiment.

Next, with reference to FIGS. 5A, 5B, 5C, 6, 7A, 7B, and 7C, a first aspect will be described of focus detection point arrangement in the first embodiment. FIGS. 5A, 5B, and 5C are diagrams for explaining a setting state of the focus detection points in the photographing range, and FIG. 6 is a flowchart illustrating a flow of the focus detection point arrangement.

In the first aspect of the focus detection point arrangement, focus detection points 54 are arranged more densely in a partial region 53 including a target subject 52 identified within a photographing range 51 than in an outer region 55 other than the partial region 53.

First, in step S111, the image to be processed is input to the subject identifying unit 115. Next, in step S112, the subject identifying unit 115 identifies the subject that is the target of the focus detection point arrangement from the photographing range 51. The subject is identified on the basis of the subject detection technology, the input from the user, or the like as described above. Target subject information is supplied to the focus detection control unit 121. In the example of FIG. 5A, a bird in the photographing range 51 is identified as the target subject 52. Note that, in the photographing range 51, as illustrated in FIG. 5A, the multiple focus detection points 54 are equally arranged over the entire surface as an initial state. The initial state is a state in which the focus detection point arrangement by the focus detection control unit 121 is not performed at all after starting the imaging apparatus 100, and the focus detection points 54 are arranged over the entire surface of the photographing range 51 or a predetermined range. The arrangement of the focus detection points 54 in the initial state may be not only an arrangement over the entire surface of the photographing range 51 but also an arrangement to form a substantially cross shape at the approximate center of the photographing range 51, or an arrangement to form a rectangular region at the approximate center, for example. In a state in which focus detection point arrangement according to the present technology is not performed, the imaging apparatus 100 performs autofocus control using the signal from the phase difference detection pixel corresponding to the focus detection points arranged in the initial state.

Next, in step S113, as illustrated in FIG. 5B, the focus detection control unit 121 determines the partial region 53 that is a region in which the focus detection points 54 are locally arranged so that the entire target subject 52 is included.

Next, in step S114, as illustrated in FIG. 5C, the focus detection control unit 121 determines the arrangement of the focus detection points 54 within the partial region 53.

For example, in a case where the partial region 53 has a rectangular shape, the arrangement of the focus detection points 54 is determined such that the total number of the longitudinal×lateral focus detection points 54 is a predetermined number corresponding to the size of the partial region 53, and those focus detection points 54 are equally arranged within the partial region 53 at intervals corresponding to the size of the partial region 53.

The number of the focus detection points 54 corresponding to the size of the partial region 53 and the interval between the focus detection points 54 can be obtained by, for example, causing the focus detection control unit 121 to hold a table in which the size of the partial region 53, the number of the focus detection points 54, and the interval between the focus detection points 54 are made to correspond to each other, and referring to the table. In addition, the number and interval may be obtained from an arithmetic expression indicating a correspondence between the size of the partial region 53, the number of the focus detection points 54, and the focus detection points 54.

The focus detection control unit 121 determines the arrangement of the focus detection points 54 such that the interval between the focus detection points 54 is narrower in the partial region 53 than in the outer region 55 other than the partial region 53 in the photographing range 51. By concentrating and densely arranging the focus detection points 54 in the partial region 53 in this manner, it is possible to improve the accuracy of autofocus with respect to the target subject 52.

Referring back to the flowchart, the description will be continued. In step S115, the focus detection control unit 121 outputs the focus detection point information to the display control unit 110 and the AF control unit 114. Then, the display control unit 110 displays the focus detection points 54 on the display unit 112, and the AF control unit 114 performs autofocus control based on the defocus amount at each of the focus detection points 54.

Note that, in the case of the first aspect, the focus detection points 54 may be arranged in the outer region 55 other than the partial region 53 as illustrated in FIG. 5C. In this case, in the outer region 55, the interval between the focus detection points 54 is wider than within the partial region 53, and the focus detection points 54 are arranged to be sparser than within the partial region 53. As a result, in the partial region 53, while the target subject 52 is reliably captured by the densely arranged focus detection points 54, even if the target subject 52 comes out of the partial region 53, the target subject 52 can be captured with the focus detection points 54 existing in the outer region 55 other than the partial region 53. Accordingly, it is possible to perform focusing on the target subject 52 by autofocus in both the partial region 53 and the outer region 55.

Figure 7A:
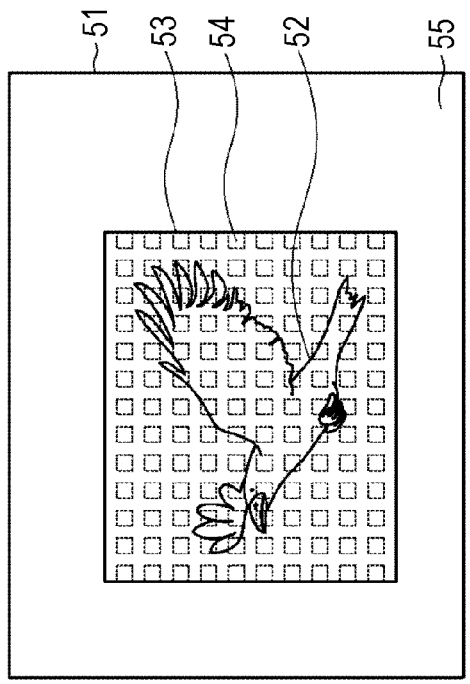
FIGS. 7A 7B, and 7C are diagrams for explaining other examples of the first aspect in the first embodiment.

Note that, the arrangement of the focus detection points 54 in the outer region 55 may be arranged more sparsely than in the partial region 53 by leaving the initial state. Alternatively, as illustrated in FIG. 7A, the arrangement may be sparsely arranged by making the number of the focus detection points 54 smaller than in the initial state. As a result, it is possible to preferentially use calculation resources for autofocus, in the partial region 53.

Figure 7B:
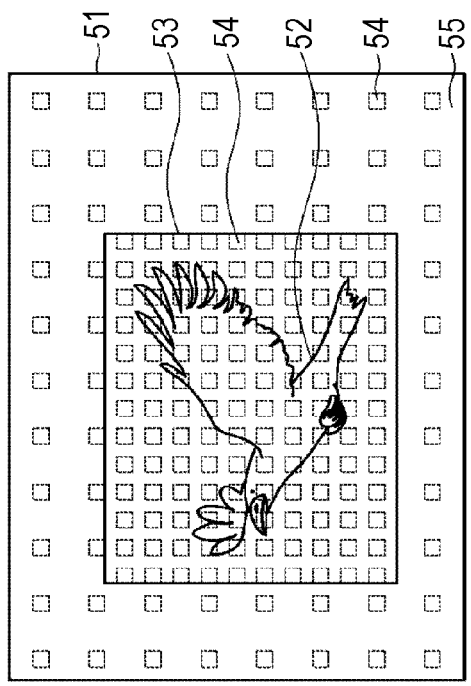

Note that, as described above, there is an image pickup device enabled to select only the signal from the phase difference detection pixel and independently read and supply the signal to the signal processing LSI 105. In a case where such an image pickup device is used and the partial region 53 is set on the basis of the subject detection technology, the input from the user, or the like, the autofocus control may be performed by reading the signal from only the phase difference detection pixels included in the partial region 53. In this case, reading is not performed from the phase difference detection pixels not included in the partial region 53, so that the focus detection points 54 are not arranged except for the partial region 53 as illustrated in FIG. 7B. As a result, the calculation resources for autofocus can be concentrated only on the partial region 53, so that it is possible to achieve reduction of the processing load, speeding up of the detection processing, reduction of the data rate, reduction of the power consumption, and the like. Note that, at this time, regarding the normal pixels, reading is performed from all the normal pixels. The fact that it is possible to omit the arrangement of the focus detection points except for the partial region in a case where the image pickup device enabled to select and read only the signal from the phase difference detection pixels is used, as described above, is similarly applied in second and third aspects, a second embodiment, a third embodiment and modification below.

Note that, in the case of a normal image pickup device, all the normal pixels and all the phase difference detection pixels are read, and then arrangement of the focus detection points is performed.

The number of focus detection points may or may not be constant, in the initial state and after the arrangement is changed by using the present technology. In addition, in a case where the calculation resources are restricted, the arrangement of the focus detection points is changed within the range of the calculation resources.

Figure 7C:
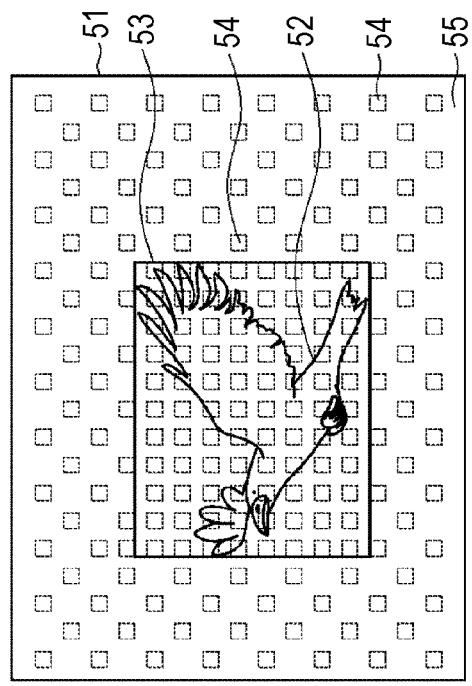

Note that, the partial region 53 may be set such that the side of the rectangular-shaped partial region 53 is positioned at a position separated by a predetermined distance from the upper, lower, right and left end portions of the target subject 52 as illustrated in FIG. 5C. Alternatively, as illustrated in FIG. 7C, the sides of the partial region 53 may be set to respectively coincide with the upper, lower, right and left end portions of the target subject 52.

According to the first aspect, the focus detection points 54 are arranged more densely in the partial region 53 including the target subject 52 than tin he outer region 55 other than the partial region 53, whereby it is possible to improve the accuracy of autofocus with respect to the target subject 52.

1-3. Second Aspect of Focus Detection Point Arrangement

Figure 8A:
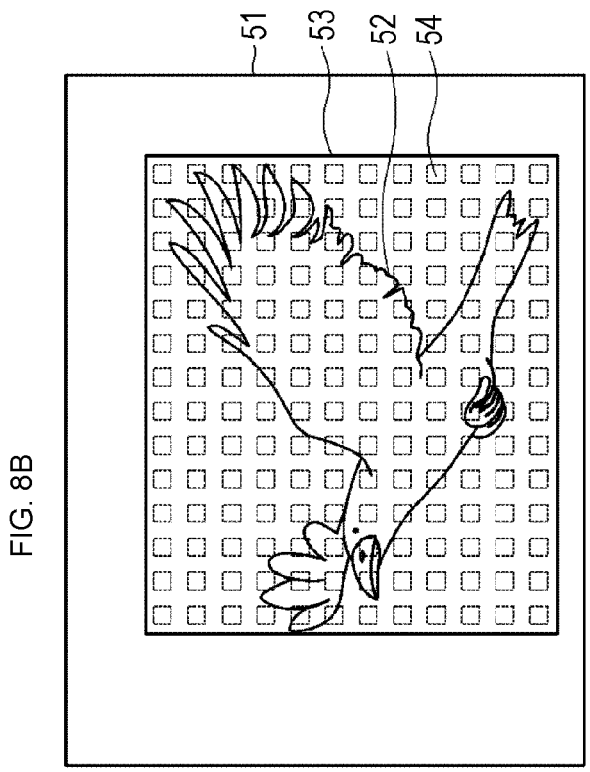
FIGS. 8A and 8B are diagrams for explaining a second aspect in the first embodiment.
Figure 8B:
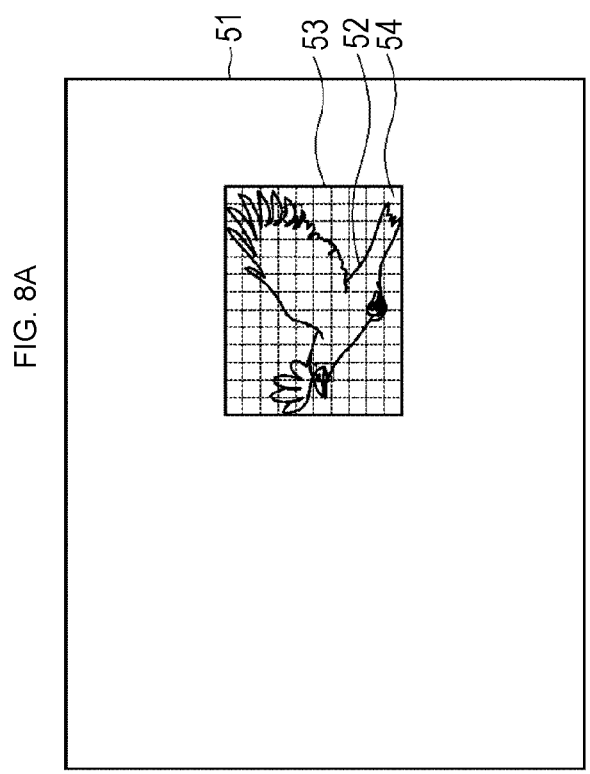
Figure 9:
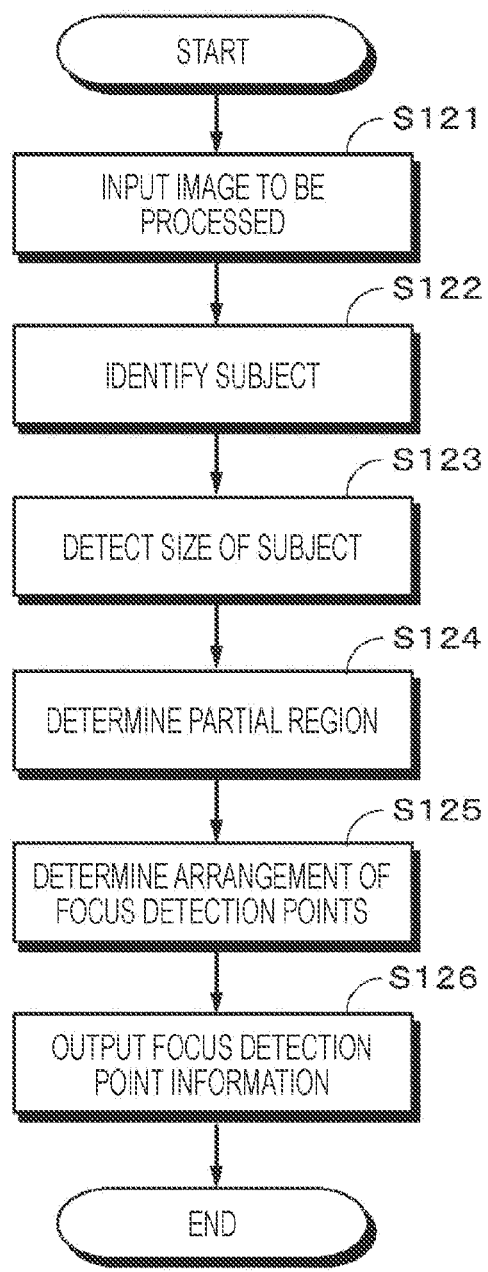
FIG. 9 is a flowchart illustrating processing of the second aspect in the first embodiment.

Next, with reference to FIGS. 8A, 8B, and 9, a second aspect will be described of focus detection point arrangement in the first embodiment. FIGS. 8A and 8B are diagrams for explaining a setting state of the focus detection points in the photographing range. FIG. 8A is a diagram illustrating an example in a case where the target subject is small, and FIG. 8B is a diagram illustrating an example in a case where the target subject is large. FIG. 9 is a flowchart illustrating a flow of the focus detection point arrangement.

In the second aspect of the focus detection point arrangement, the focus detection points 54 are arranged, in accordance with the size (area) of the target subject 52, in the partial region 53 including the target subject 52 identified within the photographing range 51.

First, in step S121, the image to be processed is input to the subject identifying unit 115. Next, in step S122, the subject identifying unit 115 identifies the subject that is the target of the focus detection point arrangement from the photographing range 51. The target subject 52 is identified on the basis of the subject detection technology, the input from the user, or the like as described above. In the example of FIG. 8A, a bird in the photographing range 51 is identified as the target subject 52.

Next, in step S123, the subject identifying unit 115 detects the size of the target subject 52. The size of the target subject 52 can be obtained by the subject recognition technology described above. In addition, the size of the subject may be detected on the basis of the input by the user. For example, a frame indicating the size of the subject is superimposed and displayed on the monitoring image displayed on the display unit 112, the user adjusts the size of the frame by input, and the size of the frame determined is set as the target subject 52. Then, the target subject information indicating a position and size of the target subject 52 is supplied to the focus detection control unit 121.

Next, in step S124, the focus detection control unit 121 determines the partial region 53 so that the entire target subject 52 is included. Then, in step S125, the focus detection control unit 121 determines an interval between the focus detection points 54 within the partial region 53 in accordance with the size of the target subject 52, and determines the arrangement of the focus detection points 54 so that the focus detection points 54 are arranged equally within the partial region 53 at the interval. The interval between the focus detection points 54 corresponding to the size of the target subject 52 can be determined by, for example, causing the focus detection control unit 121 to hold a table in which the size of the target subject 52 and the interval between the focus detection points 54 are made to correspond to each other, and referring to the table. In addition, the interval may be obtained from an arithmetic expression indicating a correspondence between the size of the target subject 52 and the focus detection points 54.

In addition, the interval of the focus detection points 54 corresponding to the area of the partial region 53 may be obtained by comparing the area of the partial region 53 with a predetermined threshold value, and making the interval of the focus detection points 54 to correspond to each of a case where the area of the partial region 53 is equal to or more than the threshold value, and a case where the area is equal to or less than the threshold value. Note that, the threshold value is not limited to one, but a plurality of threshold values may be set, and the interval between the focus detection points 54 may be made to correspond to each of the threshold values.

Then, in step S126, the focus detection control unit 121 outputs the focus detection point information to the AF control unit 114 and the display control unit 110. Then, the display control unit 110 displays the focus detection points 54 on the display unit 112, and the AF control unit 114 performs autofocus control based on the defocus amount at each of the focus detection points 54.

In the present embodiment, as illustrated in FIG. 8A, as the area of the partial region 53 decreases, that is, as the target subject 52 becomes smaller, a gap between the focus detection points 54 is made smaller, and the focus detection points 54 are arranged densely within the partial region 53. On the other hand, as illustrated in FIG. 8B, as the area of the partial region 53 increases, that is, as the target subject 52 becomes larger, the interval between the focus detection points 54 is made larger as compared with a case where the target subject 52 is small, and the focus detection points 54 are arranged within the partial region 53.

Note that, in the second aspect as well, similarly to the first aspect, as illustrated in FIG. 7A, the focus detection points 54 in the outer region 55 may be arranged more sparsely than in the initial state, or as illustrated in FIG. 7B, the focus detection points 54 may not be arranged in the outer region 55.

According to the second aspect, in a case where the target subject 52 is small, the accuracy of the autofocus is increased by densely arranging the focus detection points 54, and photographing is enabled without missing the target subject 52. On the other hand, in a case where the target subject 52 is large, the gap between the focus detection points 54 is made larger and the entire target subject 52 is covered with the focus detection points 54, and photographing is enabled without missing the target subject 52.

1-4. Third Aspect of Focus Detection Point Arrangement

Figure 10A:
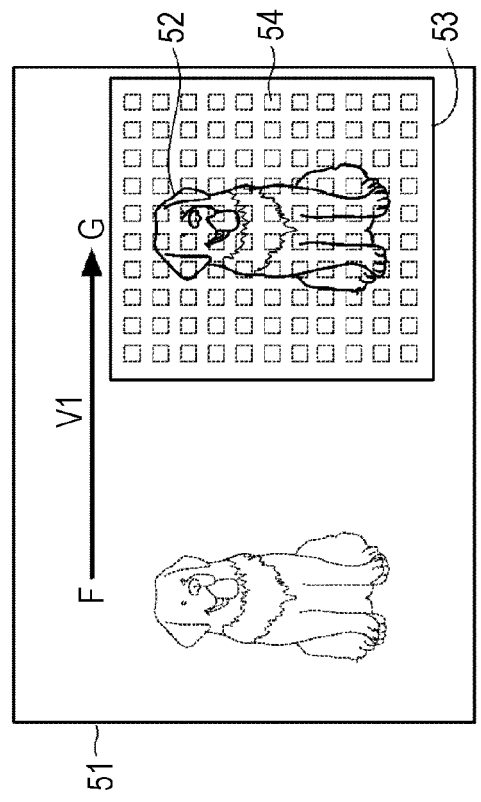
FIGS. 10A, 10B, and 10C are diagrams for explaining a third aspect in the first embodiment.
Figure 10B:
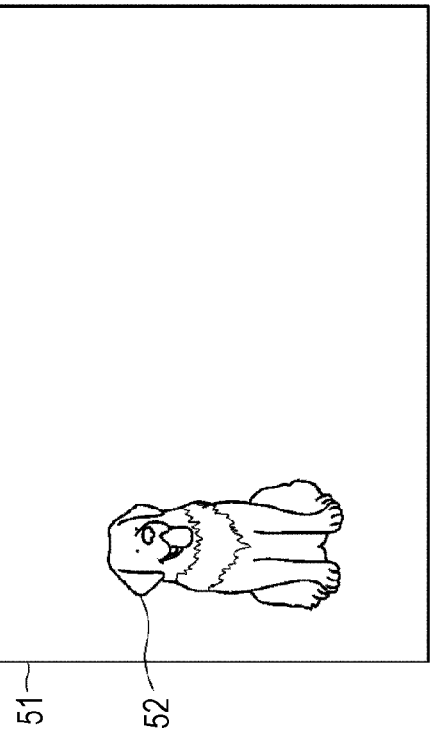
Figure 10C:
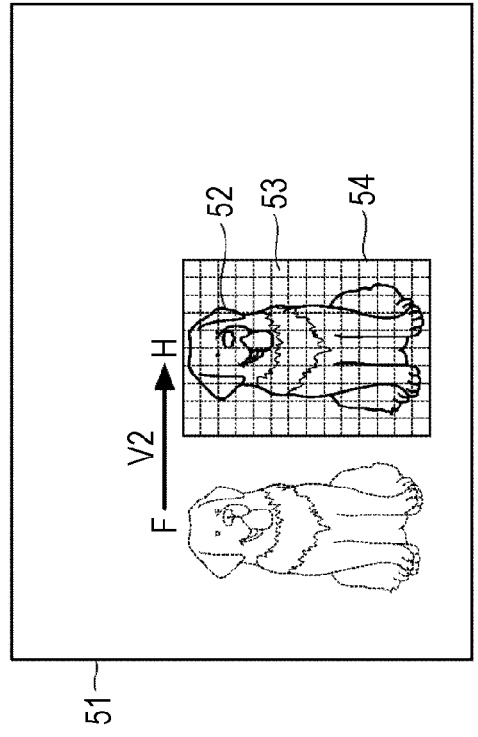
Figure 11:
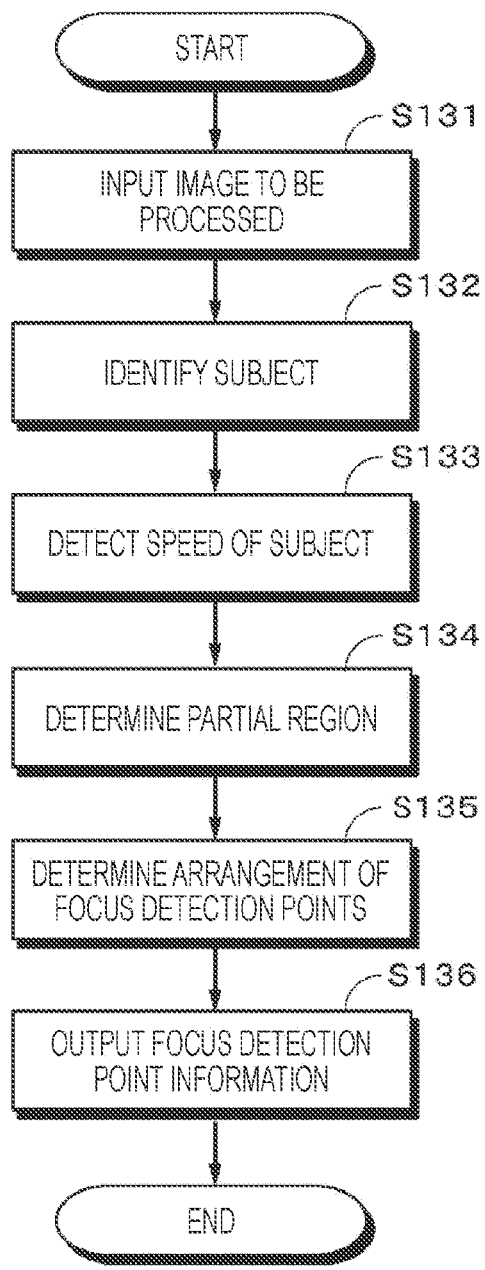
FIG. 11 is a flowchart illustrating processing of the third aspect in the first embodiment.

Next, with reference to FIGS. 10A, 10B, 10C, 11, 12A, 12B, 12C, and 12D, a third aspect will be described of focus detection point arrangement in the first embodiment. FIGS. 10A, 10B, and 10C are diagrams for explaining a setting state of the focus detection points in the photographing range. FIG. 11 is a flowchart illustrating a flow of the focus detection point arrangement. FIGS. 12A, 12B, 12C, and 12D are diagrams for explaining other examples of the setting state of the focus detection points in the photographing range.

In the third aspect of the focus detection point arrangement, the partial region 53 is determined in accordance with a moving speed of the target subject 52 identified in the photographing range 51, and the focus detection points 54 are arranged.

First, in step S131, the image to be processed is input to the subject identifying unit 115. Next, in step S132, the subject identifying unit 115 identifies the target subject 52 that is the target of the focus detection point arrangement from the photographing range 51. The target subject 52 is identified on the basis of the subject detection technology, the input from the user, or the like as described above. In the example of FIG. 10A, a dog in the photographing range 51 is identified as the target subject 52.

Next, in step S133, the subject identifying unit 115 detects a speed of the target subject 52. The speed can be calculated from an amount of movement of the position of the target subject 52 between the current frame and the previous frame of the image to be processed, and an elapsed time between the current frame and the previous frame, for example. In this manner, speed information of the target subject 52 acquired is supplied to the focus detection control unit 121.

Next, in step S134, the focus detection control unit 121 determines the partial region 53 in accordance with the speed of the target subject 52. Regarding the partial region 53, the speed of the target subject 52 is compared with a predetermined threshold value, and the size of the partial region 53 is made to correspond to each of a case where the speed is equal to or more than the threshold value, and a case where the speed is equal to or less than the threshold value, and the size of the partial region 53 may be obtained in accordance with the speed of 52. Note that, the threshold value is not limited to one, but a plurality of threshold values may be set, and the size of the partial region 53 may be made to correspond to each of the threshold values. Alternatively, a table is held in which the speed of the target subject 52 and the size of the partial region 53 are made to correspond to each other, and the size of the partial region 53 may be obtained corresponding to the speed of the target subject 52, by referring to the table. Further, the size may be obtained from an arithmetic expression indicating a correspondence between the speed of the target subject 52 and the size of the partial region 53.

Next, in step S135, the focus detection control unit 121 determines an interval between the focus detection points 54 within the partial region 53 in accordance with the speed of the target subject 52, and determines the arrangement of the focus detection points 54 so that the focus detection points 54 are arranged equally within the partial region 53 at the interval.

For example, the speed of the target subject 52 is compared with a predetermined threshold value, and the interval of the focus detection points 54 is made to correspond to each of a case where the speed is equal to or more than the threshold value, and a case where the speed is equal to or less than the threshold value, and the interval between the detection points 54 may be obtained corresponding to the speed of the target subject 52. Note that, the threshold value is not limited to one, but a plurality of threshold values may be set, and the interval between the focus detection points 54 may be made to correspond to each of the threshold values. Alternatively, a table is held in which the speed of the target subject 52 and the interval between the focus detection points 54 are made to correspond to each other, and the interval may be obtained between the focus detection points 54 corresponding to the speed of the target subject 52, by referring to the table. Further, the interval may be obtained from an arithmetic expression indicating a correspondence between the speed of the target subject 52 and the interval between the focus detection points 54.

Cases will be described as examples, a case where the target subject 52 moves from a position F to a position G at a speed V1 as illustrated in FIG. 10B, and a case where the target subject 52 moves from the position F to a position H at a speed V2 (slower than the speed V1) as illustrated in FIG. 10C.

Since the speed V1 is faster than the speed V2, the partial region 53 in FIG. 10B is made larger than the partial region 53 in FIG. 10C. On the other hand, since the speed V2 is slower than the speed V1, the focus detection points 54 in FIG. 10C are arranged more densely than the focus detection points 54 in FIG. 10B.

Then, in step S136, the focus detection control unit 121 outputs the focus detection point information to the AF control unit 114 and the display control unit 110. Then, the display control unit 110 displays the focus detection points 54 on the display unit 112, and the AF control unit 114 performs autofocus control based on the defocus amount at each of the focus detection points 54.

As described above, the focus detection points 54 are widely arranged for a subject having a faster speed, and the focus detection points 54 are concentrated and densely arranged for the target subject 52 having a slower speed. As a result, even if the speed of the subject is fast, the subject can be supplemented, and photographing is enabled without missing the subject.

Note that, the subject identifying unit 115 may detect the moving direction in addition to the speed of the target subject 52, and the focus detection control unit 121 may arrange the focus detection points 54 corresponding to the moving direction of the target subject 52. The moving direction of the target subject 52 can be acquired from, for example, a change in the position of the target subject 52 between the previous frame and the current frame of the image to be processed. Moving direction information is supplied to the focus detection control unit 121 together with the speed information of the target subject 52.

Figure 12B:
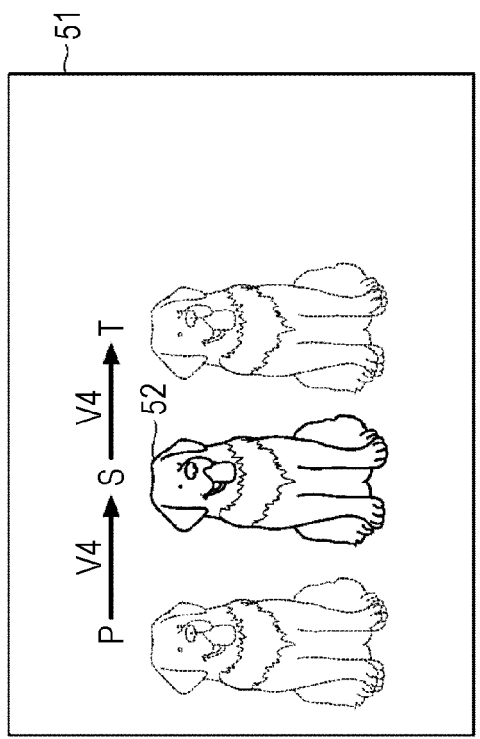
FIGS. 12A, 12B, 12C, and 12D are diagrams for explaining other examples of the third aspect in the first embodiment.
Figure 12D:
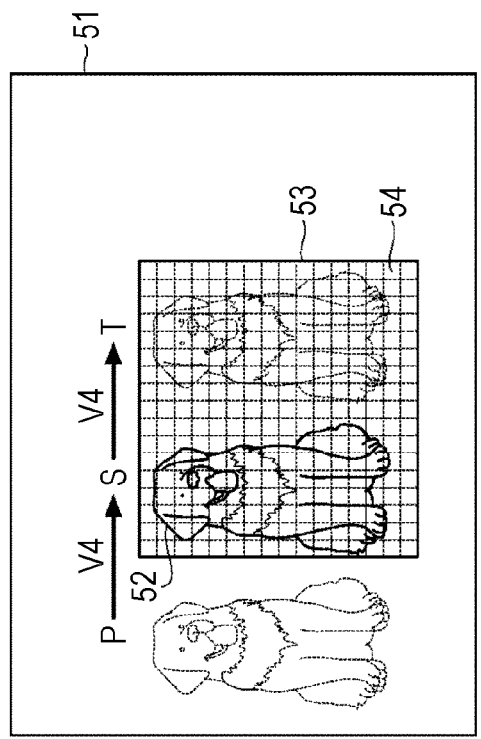
Figure 12A:
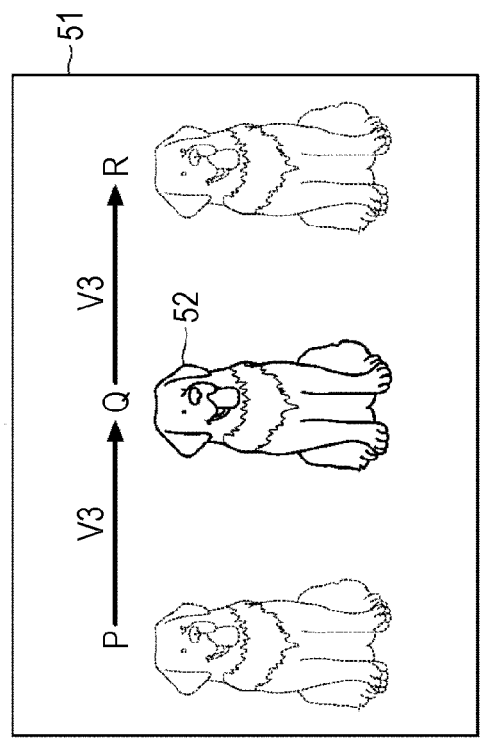

Here, cases will be described as examples, a case where the target subject 52 moves from a point P to a point Q that is a current position at a speed V3 as illustrated in FIG. 12A, and a case where the target subject 52 moves from the point P to a point S that is a current position at a speed V4 (slower than the speed V3) as illustrated in FIG. 12B.

In the case where the target subject 52 moves from the point P to the point Q in FIG. 12A, from the speed V3 and an elapsed time t, it can be predicted that the target subject 52 further moves from the point Q that is the current position to a point R after t seconds. On the other hand, in the case where the target subject 52 moves from the point P to the point S in FIG. 12B, from the speed V4 and the elapsed time t, it can be predicted that the target subject 52 further moves from the point S that is the current position to a point T after t seconds.

Figure 12C:
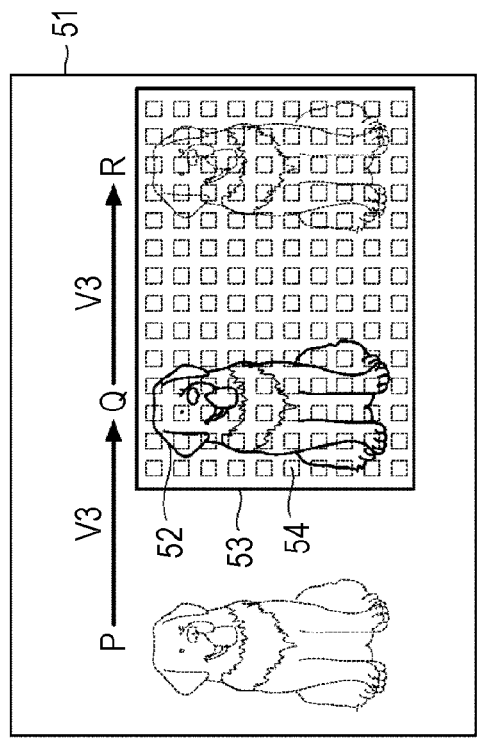

In this case, as illustrated in FIG. 12C, the focus detection control unit 121 desirably arranges the focus detection points 54 by determining the partial region 53 so that the point Q that is the current position and the point R are included. In addition, as illustrated in FIG. 12D, the focus detection control unit 121 desirably arranges the focus detection points 54 by determining the partial region 53 so that the point S that is the current position and the point T are included.

Further, since the speed V3 is faster than the speed V4, as illustrated in FIG. 12C, in a case where the subject moves at the speed V3, the focus detection control unit 121 arranges the focus detection points 54 by widening the partial region 53 as compared with a case where the subject moves at the speed V4. In addition, since the speed V4 is slower than the speed V3, as illustrated in FIG. 12D, in a case where the subject moves at the at the speed V4, the focus detection control unit 121 arranges the focus detection points 54 more densely by narrowing the partial region 53 as compared with a case where the subject moves at the speed V3.

By arranging the focus detection points 54 in this manner, a current position, a predicted arrival point, and an entire movement path from the current position to the predicted arrival point can be covered with the focus detection points 54, and the target subject 52 can be captured and photographing is enabled without missing the target subject 52.

The method of determining the arrangement of the focus detection points 54 on the basis of the moving direction is effective, for example, in a case where the subject moves in a fixed direction for a certain time or more. Examples of the case include, for example, photographing of a foot race or a car race. On the other hand, a method not based on the moving direction is effective in a case where the moving direction of the subject is not stable. For example, in the case of photographing of football or the like, the player does not always move in a fixed direction, but is expected to move in various directions. In such a case, if the moving direction is identified and the partial region 53 is determined, since there is a possibility that the subject may come out of the partial region 53, it is considered better not to be based on the moving direction.

According to the third aspect, by adjusting the density of the focus detection points 54 in accordance with the moving speed of the target subject 52 and arranging the focus detection points 54, the accuracy of the autofocus can be improved with respect to the target subject 52, and even if the moving speed of the subject is fast, the subject can be reliably captured and photographing is enabled without missing the subject.

2. Second Embodiment 2-1. Configuration of Imaging Apparatus

Figure 13:
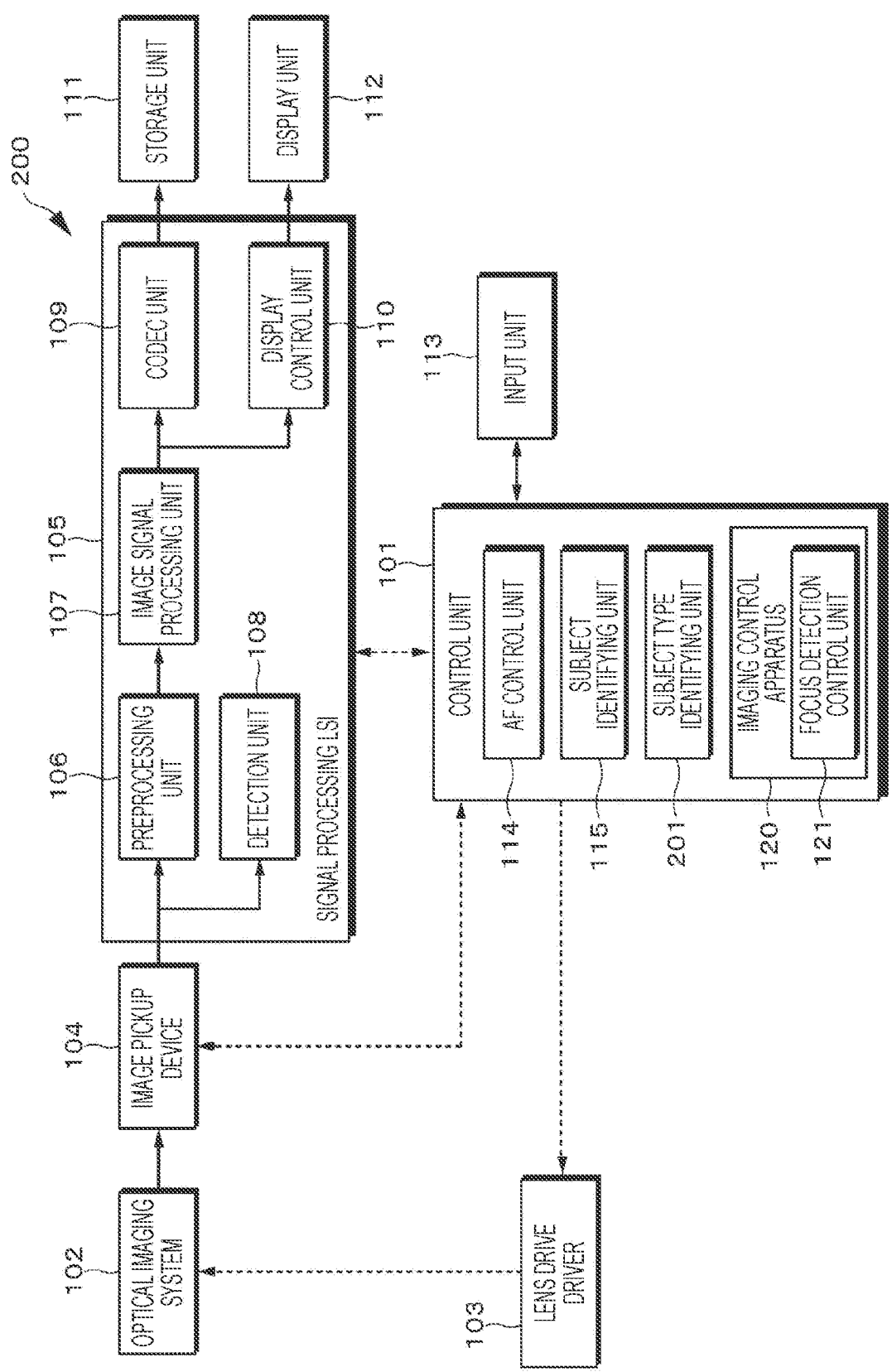
FIG. 13 is a block diagram illustrating a configuration of an imaging apparatus including an imaging control apparatus according to a second embodiment of the present technology.

First, a configuration will be described of an imaging apparatus 200 having a function of an imaging control apparatus 120 according to a second embodiment. FIG. 13 is a block diagram illustrating the configuration of the imaging apparatus 200.

The imaging apparatus 200 includes a control unit 101, an optical imaging system 102, a lens drive driver 103, an image pickup device 104, a signal processing Large-Scale Integration (LSI) 105, a preprocessing unit 106, an image signal processing unit 107, a codec unit 109, a display control unit 110, a storage unit 111, a display unit 112, an input unit 113, an AF control unit 114, a subject identifying unit 115, and a focus detection control unit 121 constituting the imaging control apparatus 120. Since this configuration is similar to the configuration in the first embodiment, the description of each unit will be omitted by citing the first embodiment.

In the second embodiment, the imaging apparatus 200 further includes a subject type identifying unit 201. The subject type identifying unit 201 performs subject type identifying processing on the target subject identified by the subject identifying unit 115 and identifies the type of the subject. Information indicating the identified type, position, size, and the like of the subject (hereinafter referred to as subject type information) is supplied to the focus detection control unit 121.

For example, the type of the subject can be detected by using known subject recognition processing, matching processing, or the like. As a recognition method, an object recognition technology based on template matching, a matching method based on luminance distribution information of a subject, a method based on a feature amount or the like of a skin color portion or a human face included in an image, or the like may be used. In addition, these methods may be combined to improve recognition accuracy.

Here, the subject to be identified is, for example, a pupil of a person. In the present embodiment, a description will be made taking the pupil of a person as an example. Regarding detection of the pupil, first, a face of a person is detected by the subject identifying unit 115, and then the subject type identifying unit 201 detects the pupil on the basis of the fact that there is a black eye in the white of the eye (there is the white of the eye around the black eye) that is a feature of the pupil, and that the interval between both eyes of the person is almost constant except for individual differences, and the like. Note that, in a case where the pupil can be directly detected without detecting the face of a person, the pupil may be detected in such way.

The imaging apparatus 200 according to the second embodiment is configured as described above. In the second embodiment, the focus detection control unit 121 determines the arrangement of a partial region that is an arrangement region of focus detection points and the arrangement of the focus detection points in accordance with the type of the subject.

Note that, the subject type identifying unit 201 may execute a predetermined program so that the control unit 101 functions as the subject type identifying unit 201. The program may be installed in the imaging apparatus 200 in advance, or may be distributed by downloading, storage medium, or the like, and installed by a user oneself. In addition, the subject type identifying unit 201 may be implemented not only by the program but also by combining dedicated hardware apparatuses, circuits, and the like having the function.

2-2. Aspect of Focus Detection Point Arrangement

Figure 14A:
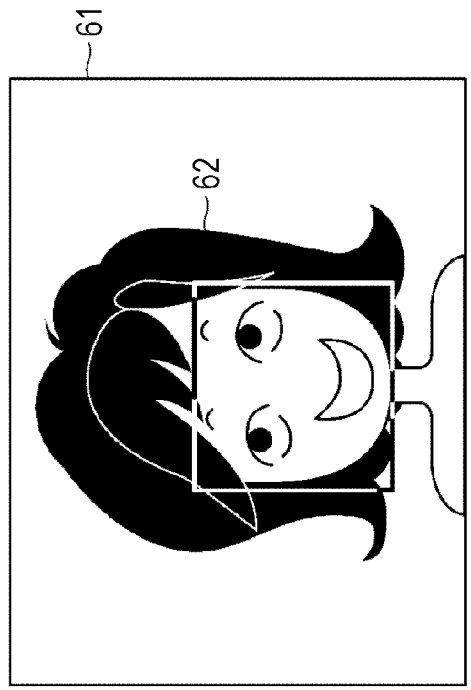
FIGS. 14A, 14B, 14C, and 14D are diagrams for explaining the second embodiment.
Figure 14B:
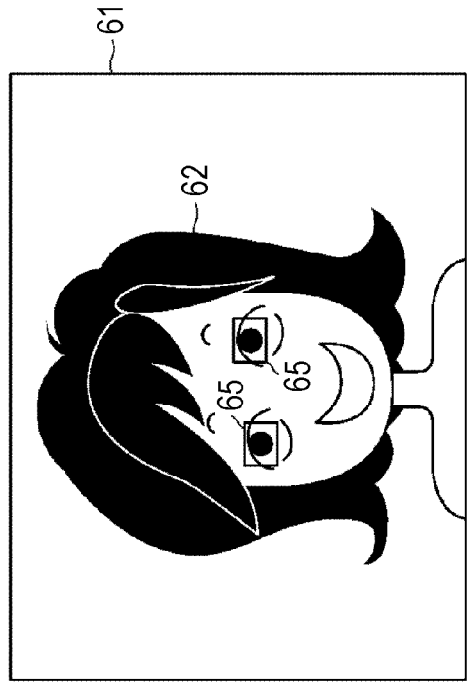
Figure 14C:
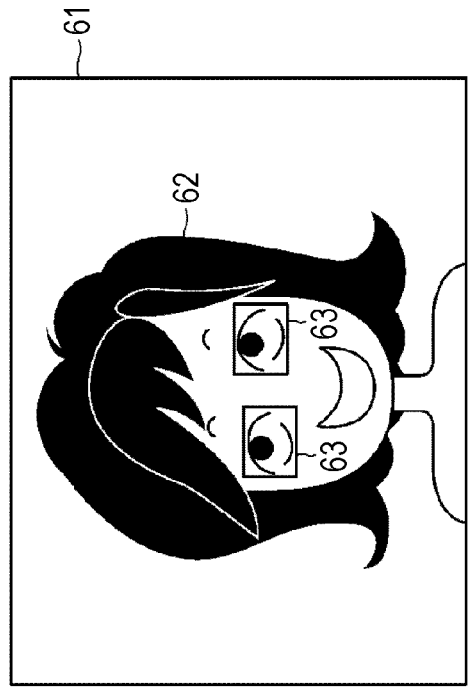
Figure 14D:
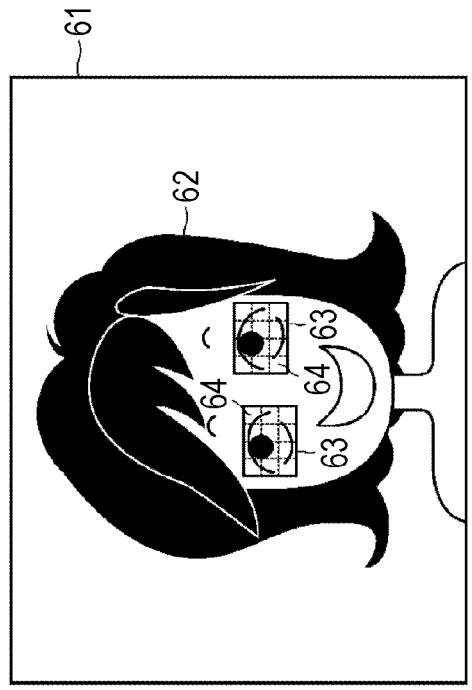
Figure 15:
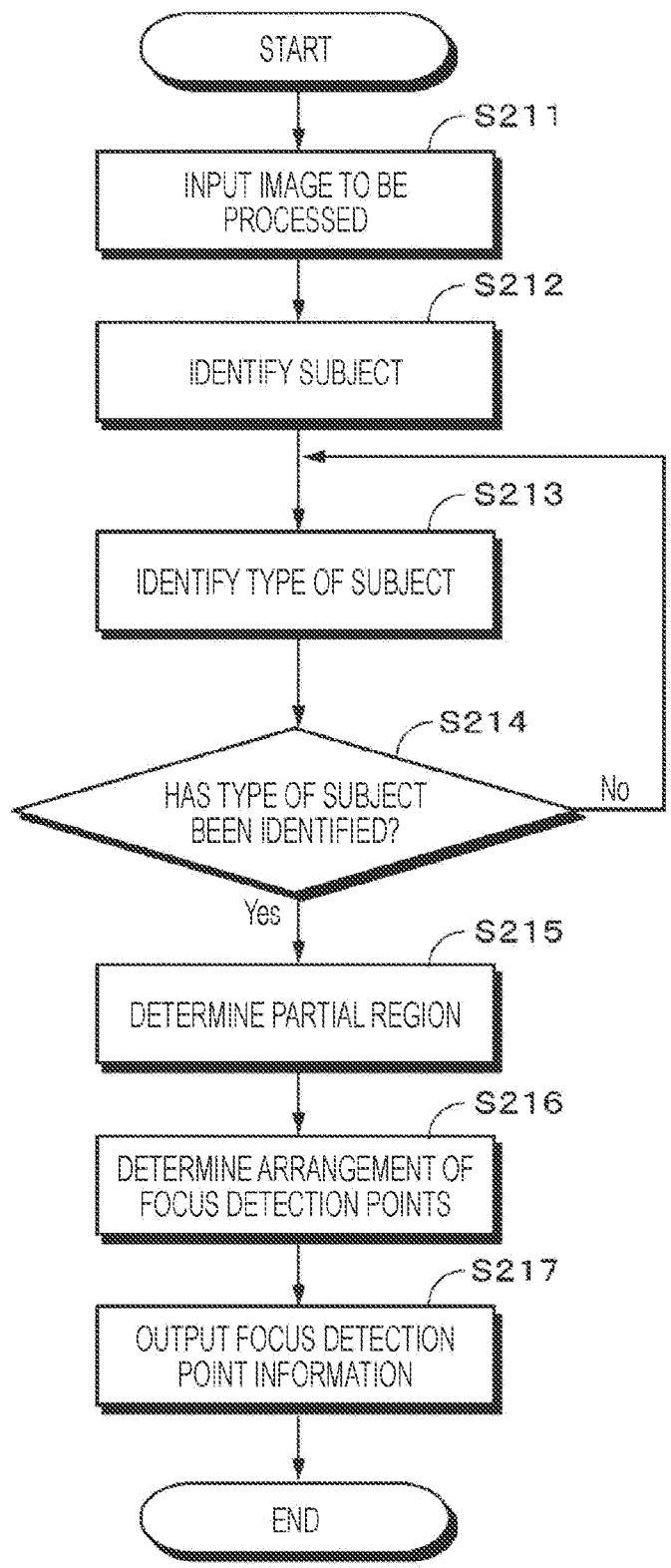
FIG. 15 is a flowchart illustrating processing in the second embodiment.

Next, with reference to FIGS. 14A, 14B, 14C, 14D, and FIG. 15, an aspect will be described of focus detection point arrangement in the second embodiment. FIGS. 14A, 14B, 14C, and 14D are diagrams for explaining a setting state of focus detection points 64 in a photographing range 61, and FIG. 15 is a flowchart illustrating a flow of the focus detection point arrangement.

In the second embodiment, the arrangement of the partial region 63 and the focus detection points 64 is determined in accordance with the type of the target subject 62 identified within the photographing range 61.

First, in step S211, the image to be processed is input to the subject identifying unit 115. Next, in step S212, as illustrated in FIG. 14A, the subject identifying unit 115 detects a face of a person from the photographing range 61. The target subject information that is the information of the face of the person detected is supplied from the subject identifying unit 115 to the subject type identifying unit 201.

Next, in step S213, the subject type identifying unit 201 identifies s pupil 65 of the person who is the target subject 62. Next, in step S214, it is determined whether or not the pupil 65 has been identified, and in a case where the pupil 65 has been identified, the processing proceeds to step S215 (Yes in step S214). Note that, in a case where the pupil 65 is not identified, steps S213 and S214 are repeated and detection of the pupil 65 is repeated (No in step S214). In a case where the pupil 65 is not identified for a predetermined time, subject identifying processing may be stopped, and processing may be performed similar to the processing in a case where the face of the person is detected. The subject type information indicating the pupil 65 identified is supplied from the subject type identifying unit 201 to the focus detection control unit 121.

Next, in step S215, the focus detection control unit 121 determines the partial region 63 so that the entire pupil 65 is included that is the target subject 62 whose type is identified. Note that, since the person usually has two pupils, the partial region 63 is set for each of the two pupils in a case where the type of the subject is the pupil, unless the pupil is hidden by a hand of the person, an object, or the like. Accordingly, there are two partial regions 63 within the photographing range 61.

Next, in step S216, the focus detection control unit 121 determines an interval between the focus detection points 64 within the partial region 63 in accordance with the size of the partial region 63, and determines the arrangement of the focus detection points 64 so that the focus detection points 64 are arranged equally within the partial region 63 at the interval. Then, in step S217, the focus detection control unit 121 outputs the focus detection point information to the AF control unit 114 and the display control unit 110. Then, the display control unit 110 displays the focus detection points 64 on the display unit 112, and the AF control unit 114 performs autofocus control based on the defocus amount at each of the focus detection points 64.

According to the second embodiment, since the focus detection points 64 are arranged in accordance with the type of the subject, it is possible to improve the accuracy of autofocus with respect to the subject whose type is identified.

Note that, in a case where the pupil 65 can be directly detected without detecting the face of the person, face detection processing in step S212 of the flowchart is unnecessary.

Note that, in the embodiment described above, the pupil is used as an example of the type of the subject; however, the type of the subject is not limited to the pupil, and any subjects can be used, such as a person, a face of a person, a face of an animal, a pupil of an animal, a license plate of a car, a sign, a signboard, and a building.

3. Third Embodiment

3-1. Configuration of Imaging Apparatus

Since a configuration of an imaging apparatus 100 having a function of an imaging control apparatus 120 according to a third embodiment is similar to the configuration of the first embodiment, the description thereof will be omitted. In the third embodiment, arrangement of focus detection points is performed on the basis of information other than a subject.

3-2. First Aspect of Focus Detection Point Arrangement

Next, with reference to FIGS. 16A, 16B, 16C, 16D, and 17, a first aspect will be described of focus detection point arrangement in the third embodiment. FIGS. 16A, 16B, 16C, and 16D are diagrams for explaining a setting state of focus detection points 73 in a photographing range 71, and FIG. 17 is a flowchart illustrating a flow of the focus detection point arrangement.

The first aspect of the focus detection point arrangement is performed in a so-called manual focus mode in which a user oneself operates the imaging apparatus 100 to perform focusing on the subject at the time of photographing. In a case where the user performs focusing with one's own operation by using a function of assisting manual focus by enlarging and displaying an arbitrary portion in the photographing range 71 on the display unit 112, a partial region 72 is set to include a focus position 75 by the manual focus is included, and the focus detection points 73 are arranged. As a result, it is possible to improve the accuracy of the autofocus with respect to a position on which the user intends to perform focusing. Accordingly, in the first aspect, the focus detection points 73 are arranged on the basis of the position of the focus position 75, not the subject.

First, in step S311, the image to be processed is input to the subject identifying unit 115. Next, in step S312, a notification is given indicating that the function of assisting manual focus is in operation, from the imaging apparatus 100 to the focus detection control unit 121. For example, the notification may be given automatically when the function of assisting manual focus is selected by the user. For example, as illustrated by a one-dot chain line in FIG. 16A, an arbitrary range in the photographing range 71 is set by the user, as a range to be enlarged by manual focus assistance.

Figure 16A:
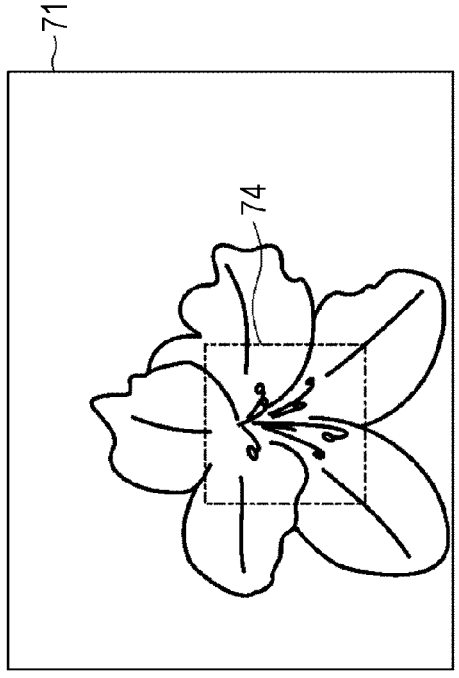
FIGS. 16A, 16B, 16C, and 16D are diagrams for explaining a first aspect in a third embodiment.
Figure 16B:
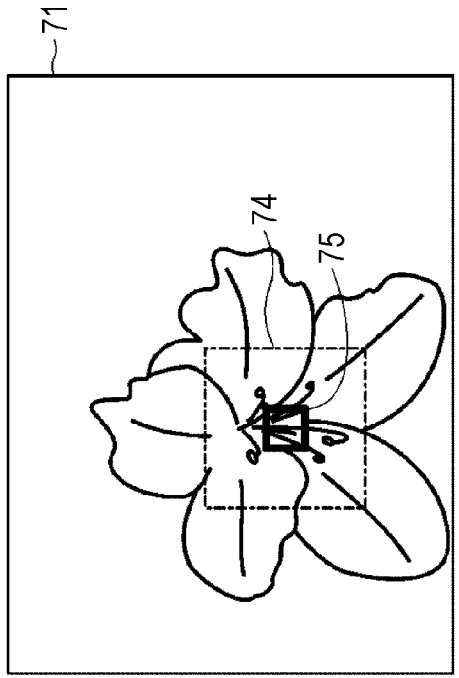
Figure 17:
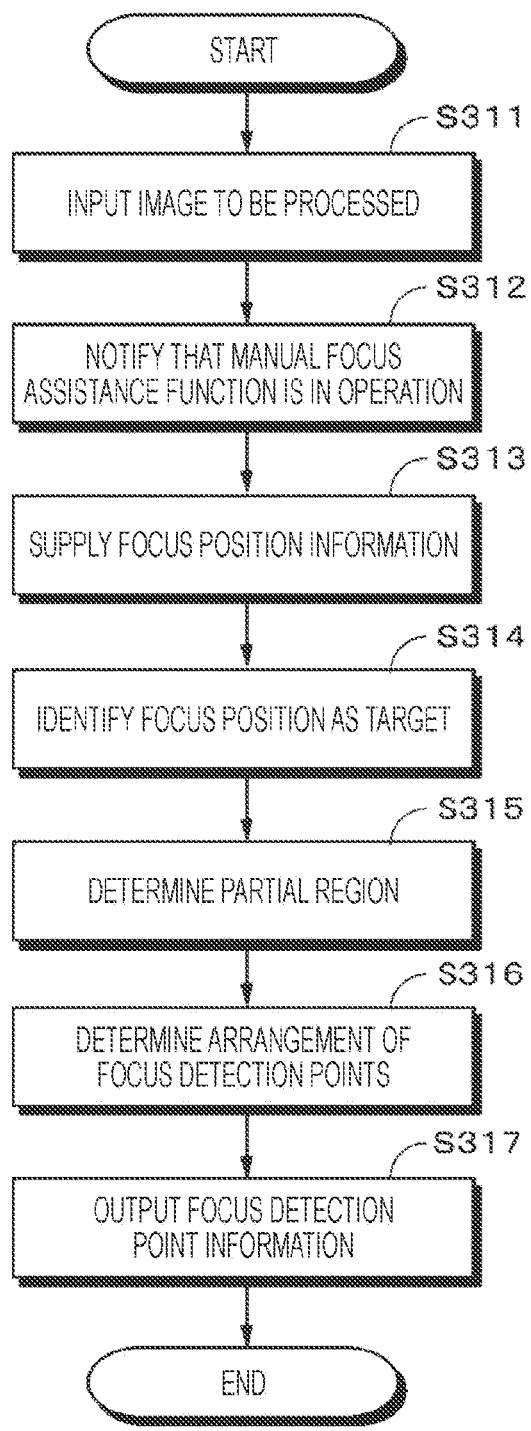
FIG. 17 is a flowchart illustrating processing of the first aspect in the third embodiment.

Then, when the user operates the imaging apparatus 100 to perform focusing on the subject by using the function of assisting manual focus, information indicating the focus position 75 (hereinafter referred to as focus position information) as illustrated in FIG. 16B is supplied to the subject identifying unit 115 in step S313. Then, in step S314, the subject identifying unit 115 identifies the focus position 75 indicated by the focus position information as a target of the focus detection point arrangement. The target information is supplied to the focus detection control unit 121.

Figure 16C:
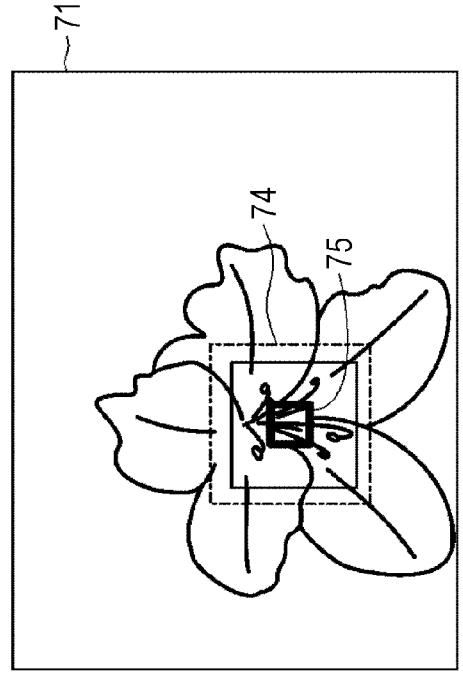

In step S315, as illustrated in FIG. 16C, the focus detection control unit 121 determines a predetermined region around the focus position 75 that is the target, as the partial region 72.

Figure 16D:
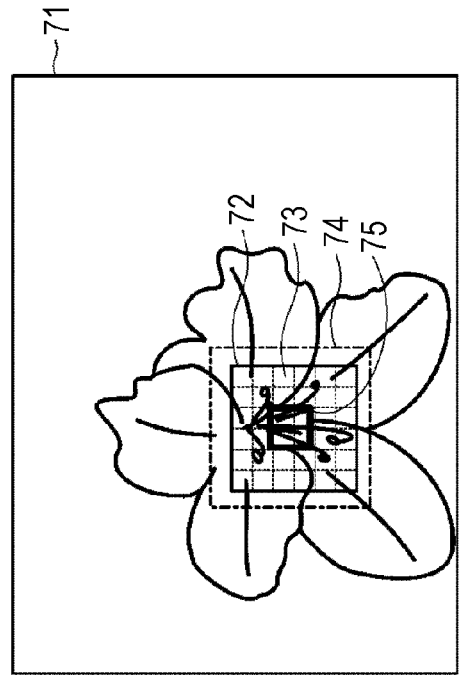

Next, in step S316, as illustrated in FIG. 16D, the focus detection control unit 121 determines the arrangement of the focus detection points 73 within the partial region 72. Then, in step S317, the focus detection control unit 121 outputs the focus detection point information to the AF control unit 114 and the display control unit 110.

In the first aspect, the focus detection points 73 are densely arranged around the focus position 75 on which the user has performed focusing in the manual focus mode. As a result, it is possible to perform focusing with high accuracy to a subject on which the user desires to perform focusing.

3-3. Second Aspect of Focus Detection Point Arrangement

Figure 18:
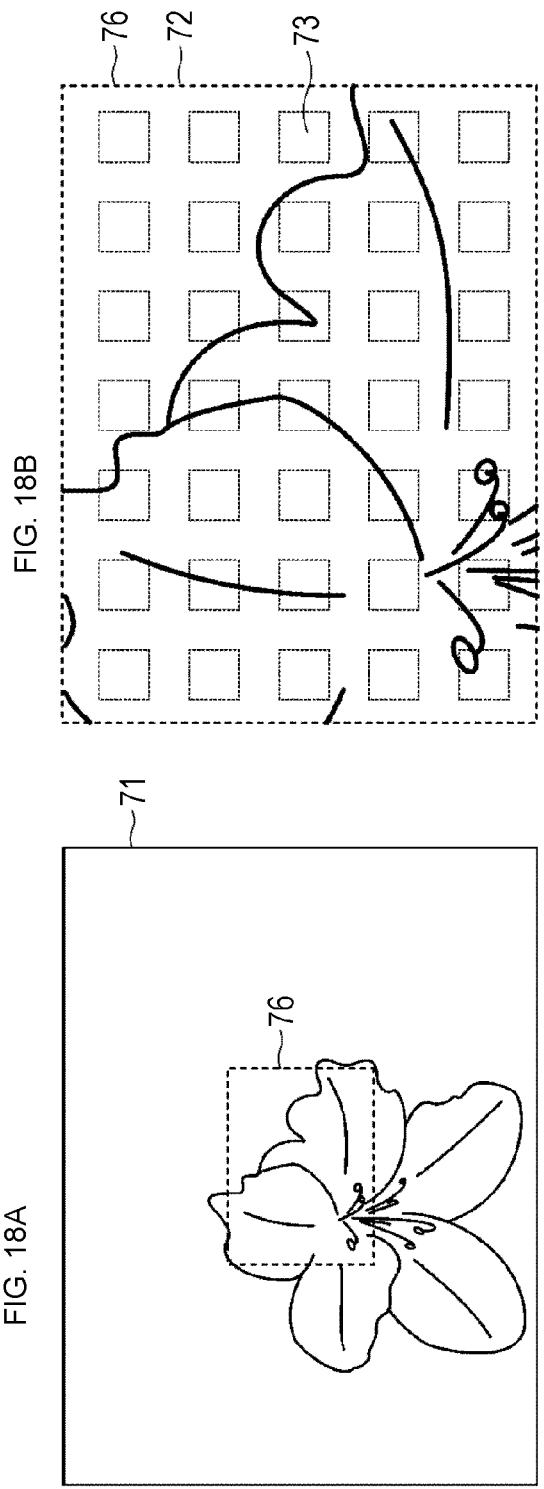
FIGS. 18A and 18B are diagrams for explaining a second aspect in the third embodiment.
Figure 19:
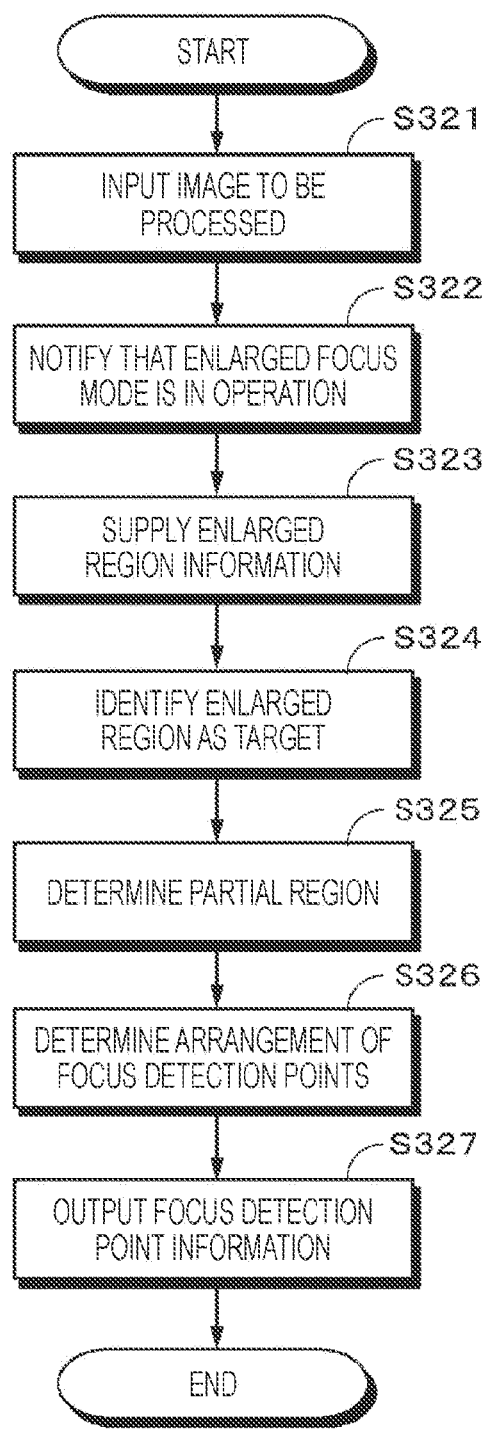
FIG. 19 is a flowchart illustrating processing of the second aspect in the third embodiment.

Next, with reference to FIGS. 18A, 18B, and 19, a second aspect will be described of focus detection point arrangement in the third embodiment. FIGS. 18A and 18B are diagrams for explaining a setting state of the focus detection points 73 in the photographing range 71, and FIG. 19 is a flowchart illustrating a flow of the focus detection point arrangement.

In the second aspect of the focus detection point arrangement, in a case where a part of the photographing range 71 such as the center of a display screen on the display unit 112 is enlarged and displayed at the time of photographing by manual focusing (hereinafter referred to as an enlarged focus mode), the focus detection points 73 are arranged only in an enlarged region 76. The enlarged region 76 is not limited to the center of the display screen displaying the photographing range 71 but may be any region in the display screen displaying the photographing range 71. Note that, the second aspect is applied only in a case where the enlarged focus is implemented by digital zooming. Accordingly, in the second aspect, the focus detection points 73 are arranged on the basis of the enlarged region 76, not the subject.

First, in step S321, the image to be processed is input to the subject identifying unit 115. Next, in step S322, a notification is given indicating that the imaging apparatus is in operation in the enlarged focus mode, to the imaging control apparatus 120. For example, the notification may be given automatically when the enlarged focus mode is selected by the user. Next, in step S323, information indicating a region enlarged and displayed as illustrated in FIG. 18A (referred to as enlarged region information) is supplied to the subject identifying unit 115. Then, in step S324, the subject identifying unit 115 identifies the enlarged region 76 indicated by the enlarged region information, as a target of the focus detection point arrangement. Information indicating the target is supplied to the focus detection control unit 121.

Next, in step S325, the focus detection control unit 121 determines the enlarged region 76 as the partial region 72. Then, in step S326, as illustrated in FIG. 18B, the focus detection control unit 121 equally arranges a predetermined number of focus detection points 73 in the enlarged region 76 that is the partial region 72. Note that, the number of the focus detection points 73 and the interval between the focus detection points 73 is desirably determined in accordance with the size of the enlarged region 76 that is the partial region 72. The number and interval can be obtained by, for example, causing the focus detection control unit 121 to hold a table in which the size of the partial region 72, the number of the focus detection points 73, and the interval between the focus detection points 73 are made to correspond to each other, and referring to the table. In addition, the number and interval may be obtained from an arithmetic expression indicating a correspondence between the size of the partial region 72, the number of the focus detection points 73, and the focus detection points 73.

Then, in step S327, the focus detection control unit 121 outputs the focus detection point information to the AF control unit 114 and the display control unit 110.

Note that, as a display method on the display unit 112 of the enlarged region 76, the enlarged region 76 may be displayed on the entire display unit 112, or the enlarged region 76 may be superimposed and displayed on the monitoring image, at the upper right of the display unit 112 or the like.

According to the second aspect, normally, the focus detection points 73 are densely arranged in the enlarged region 76 including the subject on which the user tries to perform focusing, whereby it is possible to improve the accuracy of autofocus with respect to the subject.

3-4. Third Aspect of Focus Detection Point Arrangement

Figure 21:
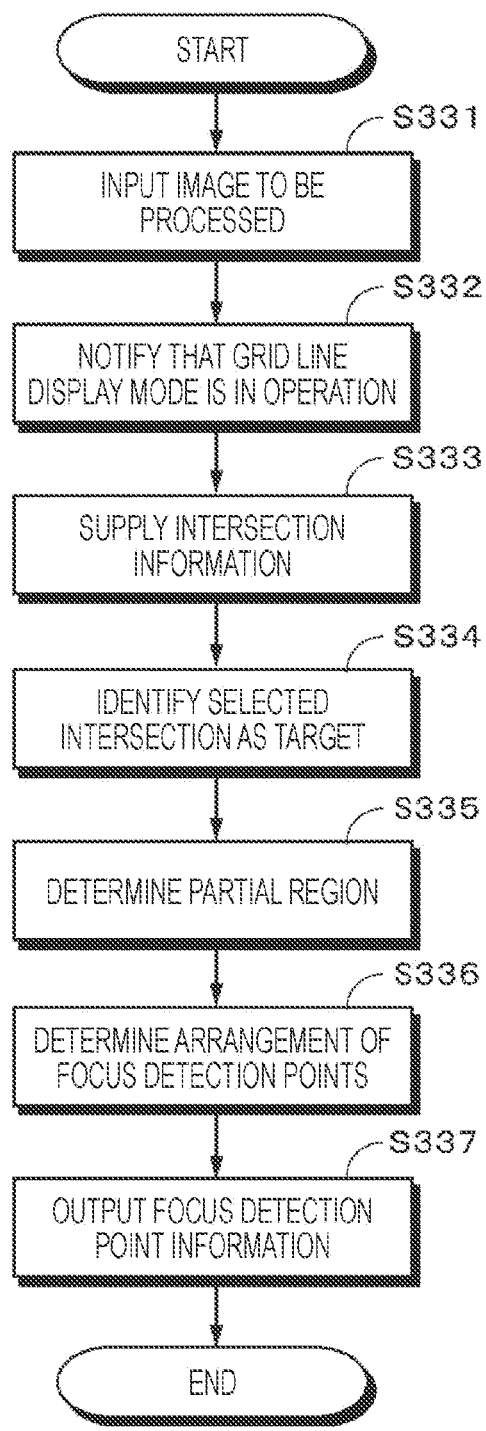
FIG. 21 is a flowchart illustrating processing of the third aspect in the third embodiment.

Next, with reference to FIGS. 20A, 20B, and 21, a third aspect will be described of focus detection point arrangement in the third embodiment. FIGS. 20A and 20B are diagrams for explaining a setting state of the focus detection points 73 in the photographing range 71, and FIG. 21 is a flowchart illustrating a flow of the focus detection point arrangement.

In the third aspect of the focus detection point arrangement, in a case where a function is used of displaying grid lines 77 extending in a longitudinal direction, a lateral direction, an oblique direction, or the like that is a reference of composition, on the monitoring image at the time of photographing, the focus detection points 73 are densely arranged in the partial region 72 including an intersection of the grid lines 77.

The composition indicates an overall configuration such as the arrangement of the subject in the photograph, and representative compositions include, for example, a diagonal composition, a rule of thirds composition, a golden ratio composition, and the like. In the third aspect, it is assumed that the user can select the intersection of the grid lines 77 that is a reference for densely arranging the focus detection points 73 (the selected intersection is referred to as a selected intersection 78). Selection of the intersection of the grid lines 77 is desirably performed, for example, by input to the touch screen as the input unit 113 integrated with the display unit 112, or by operation of an operation piece such as a cross key, a dial, or the like. Accordingly, in the third aspect, the focus detection points 73 are arranged on the basis of the position of the selected intersection 78 of the grid lines 77, not the subject.

First, in step S331, the image to be processed is input to the subject identifying unit 115. Next, in step S332, a notification is given indicating that the imaging apparatus 100 is in a mode of displaying the grid line 77, to the imaging control apparatus 120. Next, when one of the intersections of the grid lines 77 is selected by the user as the selected intersection 78, information (referred to as intersection information) indicating the selected intersection 78 selected by the user in step S333 is supplied to the subject identifying unit 115.

In step S334, the subject identifying unit 115 identifies the selected intersection 78 as a target for which the focus detection points 73 are arranged. Information indicating the target is supplied to the focus detection control unit 121. Then, in step S335, the focus detection control unit 121 determines a region having a predetermined size including the selected intersection 78 as the partial region 72. For example, the size of the partial region 72 may be set in accordance with the composition type. For example, in a composition having a large number of intersections and a composition having a small number of intersections, the partial region 72 in the former is to be set smaller than the partial region 72 in the latter. In addition, the partial region 72 may be set to include the subject overlapping with the selected intersection 78. Note that, the partial region 72 does not necessarily have to be centered on the selected intersection 78, and may be arbitrarily set as long as it includes the selected intersection 78.

Next, in step S336, the focus detection control unit 121 equally arranges the focus detection points 73 within the partial region 72. Note that, the number of the focus detection points 73 and the interval between the focus detection points 73 are desirably determined in accordance with size of the partial region 72. The number and interval can be obtained by, for example, causing the focus detection control unit 121 to hold a table in which the size of the partial region 72, the number of the focus detection points 73, and the interval between the focus detection points 73 are made to correspond to each other, and referring to the table. In addition, the number and interval may be obtained from an arithmetic expression indicating a correspondence between the size of the partial region 72, the number of the focus detection points 73, and the focus detection points 73.

Note that, since a technology has also been devised for detecting the subject with priority given to the intersection of the grid lines 77 that is the reference of the composition, by combining with the technology, it is possible to further improve the accuracy of the autofocus.

The selected intersection 78 of the grid line 77 is normally a point where the subject is positioned on which the user desires to perform focusing. Accordingly, according to the third aspect, the partial region 72 is determined to include the selected intersection 78, and the focus detection points 73 are densely arranged in the partial region 72, whereby it is possible to improve the accuracy of autofocus with respect to the subject on which the user desires to perform focusing.

4. Modification

The embodiments of the present technology have been specifically described above; however, the present technology is not limited to the embodiments described above, and various modifications can be made based on the technical idea of the present technology.

In the first to third embodiments described above, the description has been made in the order in which the partial region is determined and then the focus detection points are arranged in the partial region; however, the determination of the partial region and determination of the focus detection arrangement may be performed at the same time.

In addition, in the first to third embodiments, the focus detection points may be arranged in the outer region other than the partial region in the photographing range, or may not be arranged. In addition, the focus detection points may be arranged more sparsely in the outer region than in the partial region.

Next, a modification will be described in a case where the user can adjust the sensitivity of tracking the subject by autofocus in autofocus setting. Adjustment of the sensitivity of tracking the subject of autofocus is one of the functions of the imaging apparatus, and it is possible to adjust the degree of tracking the subject captured by autofocus. In a case where the sensitivity of tracking is low, even when an obstacle crosses the focus detection points or the focus detection points come out of the subject, focusing on the subject being captured is attempted to be continued as much as possible. On the other hand, in a case where the sensitivity of tracking is high, in a case where another subject different from the currently focused subject captured by the focus detection points crosses the focus detection points, the other subject is focused. Normally, such sensitivity of tracking the subject can be selected as a value or a plurality of levels in a setting mode or the like of the imaging apparatus.

Then, in a case where the sensitivity of tracking the subject is set to be high, that is, in a case where the focus is readily shifted from the currently focused subject to the other subject, it is desirable that the local arrangement of the focus detection points into the partial region is canceled and the focus detection points are equally arranged over the entire photographing range. As a result, since the subject can be captured by autofocus equally in the entire photographing range, even in a case where a new subject suddenly enters the photographing range, the new subject can be captured by auto focus.

Figure 22A:
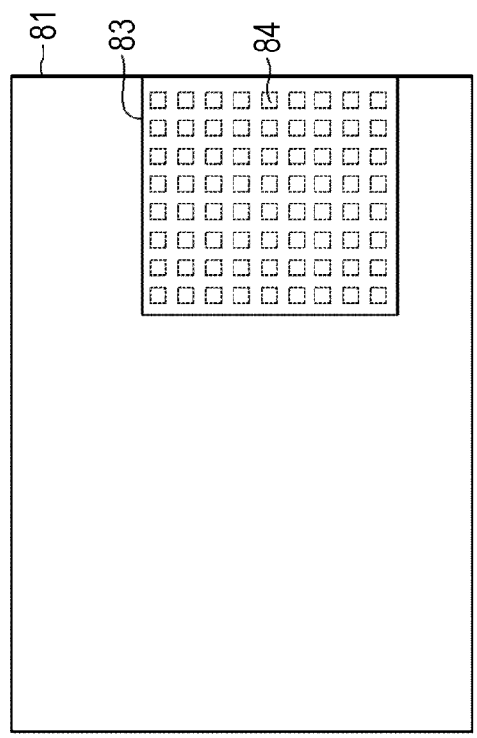
FIGS. 22A, 22B, 22C, and 22D are diagrams for explaining a modification in a case where the subject has framed out.

Next, with reference to FIGS. 22A, 22B, 22C, and 22D, a modification will be described in a case where the subject comes out of the photographing range (frame out). A case is assumed where photographing is performed by determining a partial region 83 to include a target subject 82 within a photographing range 81, and arranging focus detection points 84 in the partial region 83, as illustrated in FIG. 22A, with the method in the embodiments described above.

Figure 22B:
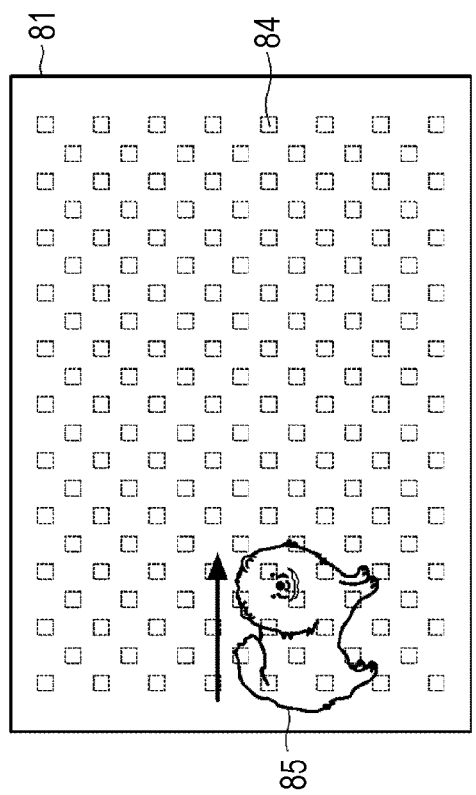
Figure 22C:
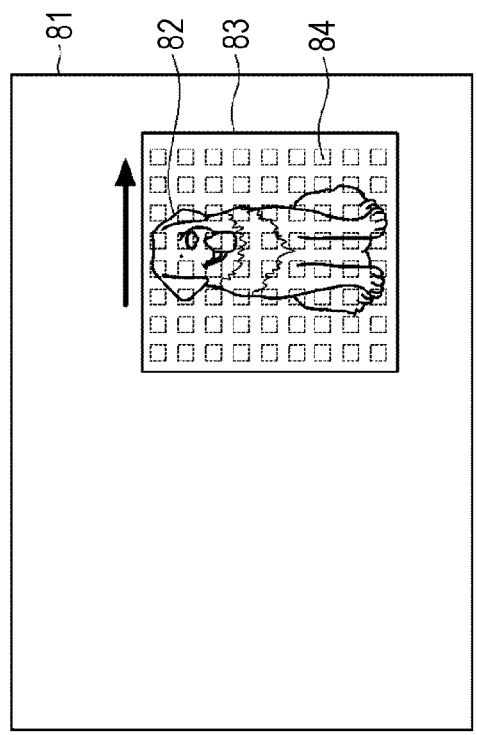

It is assumed that the target subject 82 moves rightward during the photographing and has framed out as illustrated in FIG. 22B. In this case, as illustrated in FIG. 22B, the focus detection points 84 locally arranged at the frame-out position are left for a predetermined time. As a result, as illustrated in FIG. 22C, in a case where the target subject 82 having framed out enters the photographing range 81 again from the frame-out position (frame in), it is possible to immediately perform focusing on the subject 82 again. Note that, the focus detection points 84 locally arranged are desirably left for a predetermined time, for example, several seconds. This is because, if the focus detection points 84 are left for a long time, there is a possibility that focusing is performed on a subject different from the target subject 82 having framed out.

Figure 22D:
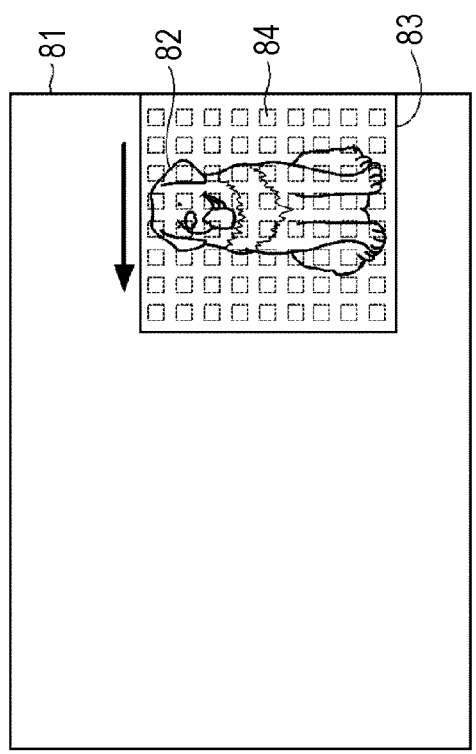

Alternatively, in a case where the target subject 82 overlapped with the focus detection points 84 has framed out, the focus detection points 84 locally arranged are canceled, and the focus detection points 84 may be arranged in the entire photographing range 81 as illustrated in FIG. 22D. In this case, in a case where the target subject 82 or another subject 85 has entered from a direction other than a direction in which the target subject 82 has framed out, it is possible to immediately perform focusing on the target subject 82 or the other subject 85.

Next, a modification will be described in the case photographing with cropping. Cropping means to cut out a part of an image in the photographing range and photograph the part, or to cut out and reproduce a part of an image on the playback screen of the image. In a case where photographing is performed with the full size (35 mm) image pickup device 104, if only the central portion of the image pickup device 104 is cut out and photographed with a small image size, an image of the Advanced Photo System-C (APS-C) size can be obtained. The APS-C is one of the size standards of the solid-state image pickup device of the digital camera.

In a case where the full-size image pickup device 104 is used to perform photographing with cropping in a state in which focusing is performed on the subject with the method in the first to third embodiments described above, the focus detection points are sparsely arranged also in a region that is not visible due to cropping. As a result, in a case where the subject has framed in from the outside of the photographing range, focusing can be immediately performed on the subject.

Next, a modification will be described of the third aspect of the first embodiment. In the third aspect of the first embodiment, the imaging apparatus 100 may include a motion sensor. The motion sensor detects movement of the imaging apparatus 100 by, for example, an acceleration sensor or an angular speed sensor for two or three axial directions, and supplies, to the control unit 101, information such as a moving speed and a moving direction of the imaging apparatus 100 itself. In addition, the motion sensor detects, by a gyro sensor, the speed (angular speed) at which the rotation angle changes when the imaging apparatus 100 is turning and the angular speed around the Y axis, and outputs the detected speed to the control unit 101.

Even in a case where the user holds the imaging apparatus 100 by hand and moves the imaging apparatus 100, the subject moves within the photographing range similarly to the third aspect of the first embodiment. In such a case, processing similar to the processing in the third aspect of the first embodiment may be performed on the basis of the moving speed and moving direction of the imaging apparatus 100.

Note that, a case where the imaging apparatus 100 moves includes not only a case where the user holds the imaging apparatus 100 by hand and moves the imaging apparatus 100 but also a case where the imaging apparatus 100 is mounted on a flying object called a drone, a case where the user wears the imaging apparatus 100 on a part of the body such as the head, and a case where the imaging apparatus 100 is mounted on a moving body, such as an in-vehicle camera, and the like.

Next, a modification will be described of the third embodiment. In the embodiment in which the focus detection points are arranged on the basis of the information from the imaging apparatus 100 described in the third embodiment, the information from the imaging apparatus 100 is not limited to that described in the third embodiment. The focus detection points may be arranged on the basis of information supplied from an imaging assistance function of the imaging apparatus 100 or information supplied from an imaging assistance function of an external device.

A function of assisting photographing of the imaging apparatus 100 includes focus detection points for the image plane phase difference AF. In this case, an arbitrary one or a plurality of focus detection points selected by the user from the plurality of focus detection points displayed on the display unit 112 are targets of the focus detection points to be densely arranged.

In addition, the information supplied from the imaging assistance function of the external device includes focus position information of a separate phase difference AF module, focus position information of contrast AF, information on a position where AF assistance light of an external strobe light hits the subject, information on an aiming light spot of an optical sight called a dot sight, information indicating a position of a line of sight in a line of sight input device, and the like.

Next, a modification will be described of the configuration of the imaging apparatus. In the configuration of the imaging apparatus 100 including the imaging control apparatus 120 illustrated in FIG. 2, processing by the imaging control apparatus 120 is performed in the control side of the imaging apparatus 100; however, the image pickup device 104 may include a control circuit, and perform setting processing of the focus detection points according to the present technology within the image pickup device 104.

As for the setting of the focus detection points according to the type of the subject, as an example, the case has been described where the subject is the pupil and two partial regions exist within the photographing range; however, also in the other embodiments, the partial region is not limited to one, and a plurality of partial regions may be set within the photographing range.

In the embodiments described above, the description has been made assuming that the partial region where the focus detection points are arranged is a rectangle; however, the partial region is not limited to a quadrangle, but may be a triangle, a circle, a shape substantially equivalent to an outline of the subject, or the like.

The user interface indicating the focus detection points on the display unit 112 may be displayed by a method other than that indicated in the embodiments. For example, the focus detection points within the partial region may be displayed with dark lines, and the focus detection points within the outer region may be displayed with thin lines or may not be displayed. In addition, the focus detection points in the partial region may be displayed with a line of conspicuous color such as red, and the focus detection points in the outer region may be displayed in a color more inconspicuous than the color of the focus detection points in the partial region, such as black and white. In addition, the focus detection points within the partial region may be displayed with bold lines, and the focus detection points within the outer region may be displayed with thin lines. Alternatively, only the focus detection points within the partial region may be made to blink. Note that, all the focus detection points within the partial region and the outer region may be displayed with the same line type and line color. In addition, colors and meshes may be displayed in the entire partial region.

Note that, the aspects and modifications of the first to third embodiments described above may be used in combination. For example, in the case where the focus detection points are arranged in the partial region in accordance with the size of the target subject, which is the second aspect of the first embodiment, as described in FIG. 7A of the first aspect of the first embodiment, the focus detection points may be more sparsely arranged in the outer region than in the partial region, or may not be arranged. In addition, also in the case where the focus detection points are arranged at the intersection of the grid lines, which is the third aspect of the third embodiment, as described in FIG. 7A of the first aspect of the first embodiment, the focus detection points may be more sparsely arranged in the outer region than in the partial region, or may not be arranged. In addition, in the case where the focus detection points are arranged in accordance with the type of the subject, which is the second embodiment, further, by using the second aspect of the first embodiment, the arrangement may be performed in accordance with the size of the subject, or by using the third aspect of the first embodiment, the arrangement may be performed in accordance with the speed of the subject.

In addition to a single-lens reflex camera, a digital camera, a digital video camera, and the like, the present technology can also be applied to any devices provided with camera functions, such as a small digital video camera that is used by an outdoor sports lover or the like for recording one's activity, a network camera, an in-vehicle camera, a surveillance camera, a camera to be mounted on a flying object such as a drone, a laptop computer, a smartphone, a tablet terminal, a portable game machine, a wristwatch type wearable terminal, an eyeglass type wearable terminal, a car navigation system, and an interphone system.

In addition, it is also possible to apply the present technology to a so-called multi camera system in which a plurality of digital cameras, digital video cameras, smartphones, and the like can be connected by a WiFi network or the like and photographing can be performed simultaneously by these plural devices. For example, in a case where the focus detection points are arranged by using the present technology in a main camera to which the user performs shutter operation or the like, the setting is transmitted to other sub cameras via a WiFi network or the like, and the setting of the focus detection points is also applied in the sub cameras.

In addition, the subject is not limited to a person, a face of a person, a pupil, or the like, but may be anything such as a car, an airplane, a train, a bicycle, a license plate of a car, a sign, a signboard, an animal, a plant, or a building.

The present technology can also adopt the following configurations.

(1)

A control apparatus including a focus detection control unit that sets a density of a focus detection point in a partial region specified, to be higher than a density of a focus detection point in a region excluding the partial region.

(2)

The imaging control apparatus according to (1), in which the focus detection control unit sets an interval between a plurality of the focus detection points in the partial region, to be narrower than an interval between the plurality of focus detection points in the outer region.

(3)

The imaging control apparatus according to (1) or (2) in which a defocus amount is acquired from a detection unit that calculates a defocus amount for each of a plurality of the focus detection points.

(4)

The control apparatus according to any of (1) to (3), in which the focus detection control unit supplies information indicating the focus detection point to a display control unit so as to display, on a display unit, a frame indicating the focus detection point, the frame corresponding to each of a plurality of the focus detection points.

(5)

The control apparatus according to any of (1) to (3), in which the subject is identified by subject detection processing or user's specification.

(6)

The control apparatus according to (4) or (5), in which the focus detection control unit adjusts an interval between a plurality of the focus detection points on the basis of a size of the subject so as to arrange the focus detection points in the partial region.

(7)

The control apparatus according to (6), in which the focus detection control unit widens the interval between the plurality of focus detection points as the subject is larger and narrows the interval between the plurality of focus detection points as the subject is smaller, so as to arrange the focus detection points in the partial region.

(8)

The control apparatus according to any of (1) to (7), in which the focus detection control unit adjusts an interval between a plurality of the focus detection points on the basis of a speed of the subject so as to arrange the focus detection points in the partial region.

(9)

The control apparatus according to (8), in which the focus detection control unit widens the interval between the plurality of focus detection points as the speed of the subject is faster and narrows the interval between the plurality of focus detection points as the speed of the subject is slower, so as to arrange the focus detection points in the partial region.

(10)

The control apparatus according to (8) or (9), in which the focus detection control unit adjusts sizes of a plurality of the partial regions on the basis of the speed of the subject.

(11)

The control apparatus according to any of (8) to (10), in which a size of the partial region is adjusted further on the basis of the moving direction of the subject.

(12)

The control apparatus according to any of (1) to (11), in which the focus detection point is arranged in the partial region including the subject whose type is identified within the photographing range, in accordance with the type.

(13)

The control apparatus according to any of (1) to (3), in which the focus detection control unit arranges a plurality of the focus detection points from the outer region outside the partial region in which a focus position within the photographing range is included, into the partial region.

(14)

The control apparatus according to any of (1) to (3), in which the focus detection control unit sets, as the partial region, a region that is a part of the photographing range and is enlarged and displayed on a display unit, and arranges a plurality of the focus detection points in the partial region.

(15)

The control apparatus according any of (1) to (3), in which the focus detection control unit arranges a plurality of the focus detection points from the outer region outside the partial region including an intersection of a plurality of lines superimposed and displayed on the photographing range displayed on a display unit, into the partial region.

(16)

The control apparatus according to any of (1) to (15), in which the focus detection is performed by an image plane phase difference method.

(17)

A control method including arranging a plurality of focus detection points to be set corresponding to focus detection pixels of an imaging unit, on the basis of a position of an identified subject, from a region outside a partial region corresponding to the subject in a photographing range of the imaging unit into the partial region.

(18)

A control program for causing a computer to execute a control method, the control method arranging a plurality of focus detection points to be set corresponding to focus detection pixels of an imaging unit, on the basis of a position of an identified subject, from a region outside a partial region corresponding to the subject in a photographing range of the imaging unit into the partial region.

REFERENCE SIGNS LIST

51, 61, 71, 81 Photographing range
52, 62, 82 Target Subject
53, 63, 72 Partial region
54, 64, 73, 84 Focus detection point
55 Outer region
75 Focus position
76 Enlarged region
120 Imaging control apparatus
121 Focus detection control unit

The invention claimed is:

1. A control apparatus, comprising
circuitry configured to
seta a density of a first plurality of focus detection points in a partial region, wherein
the density of the first plurality of focus detection points in the partial region is higher than a density of a second plurality of focus detection points in a specific region, the specific region is different from the partial region,
the density of the first plurality of focus detection points in the partial region corresponds to a distance between centers of the first plurality of focus detection points in the partial region,
the density of the second plurality of focus detection points in the specific region corresponds to a distance between centers of the second plurality of focus detection points in the specific region, and
each of the partial region and the specific region is within a photographing range.

2. The control apparatus according to claim 1, wherein the partial region is one of a region corresponding to a position of a specific subject or a user specified region.

3. The control apparatus according to claim 1, wherein
a detection unit calculates a defocus amount for each of the first plurality of focus detection points and the second plurality of focus detection points, and
the circuitry is further configured to acquire the calculated defocus amount for each of the first plurality of focus detection points and the second plurality of focus detection points from the detection unit.

4. The control apparatus according to claim 1, wherein the circuitry is further configured to
supply information to a display control unit, wherein
the information corresponds to the first plurality of the focus detection points and the second plurality of focus detection points,
the display control unit controls a display screen to display a frame, and
the frame indicates the first plurality of focus detection points and the second plurality of focus detection points.

5. The control apparatus according to claim 2, wherein the specific subject is identified based on one of a subject detection process or user specification.

6. The control apparatus according to claim 1, wherein the focus detection control unit adjusts an interval between a plurality of the focus detection points on the basis of a size of the subject so as to arrange the focus detection points in the partial region.

7. The control apparatus according to claim 6, wherein the focus detection control unit widens the interval between the plurality of focus detection points as the subject is larger and narrows the interval between the plurality of focus detection points as the subject is smaller, so as to arrange the focus detection points in the partial region.

8. The control apparatus according to claim 1, wherein the focus detection control unit adjusts an interval between a plurality of the focus detection points on the basis of a speed of the subject so as to arrange the focus detection points in the partial region.

9. The control apparatus according to claim 8, wherein the focus detection control unit widens the interval between the plurality of focus detection points as the speed of the subject is faster and narrows the interval between the plurality of focus detection points as the speed of the subject is slower, so as to arrange the focus detection points in the partial region.

10. The control apparatus according to claim 8, wherein the focus detection control unit adjusts sizes of a plurality of the partial regions on the basis of the speed of the subject.

11. The control apparatus according to claim 8, wherein a size of the partial region is adjusted further on the basis of the moving direction of the subject.

12. The control apparatus according to claim 1, wherein the focus detection point is arranged in the partial region including the subject whose type is identified within the photographing range, in accordance with the type.

13. The control apparatus according to claim 1, wherein the circuitry is further configured to
arrange a set of focus detection points from the specific region to the partial region,
wherein the second plurality of focus detection points includes the set of focus detection points.

14. The control apparatus according to claim 1, wherein the focus detection control unit sets, as the partial region, a region that is a part of the photographing range and is enlarged and displayed on a display unit, and arranges a plurality of the focus detection points in the partial region.

15. The control apparatus according to claim 1, wherein the focus detection control unit arranges a plurality of the focus detection points from the outer region outside the partial region including an intersection of a plurality of lines superimposed and displayed on the photographing range displayed on a display unit, into the partial region.

16. The control apparatus according to claim 1, wherein each of the first plurality of focus detection points and the second plurality of focus detection points is based on an image plane phase difference method.

17. A control method, comprising
setting a density of a first plurality of focus detection points in a partial region, wherein
the density of the first plurality of focus detection points in the partial region is higher than a density of a second plurality of focus detection points in a specific region,
the specific region is different from the partial region,
the density of the first plurality of focus detection points in the partial region corresponds to a distance between centers of the first plurality of focus detection points in the partial region,
the density of the second plurality of focus detection points in the specific region corresponds to a distance between centers of the second plurality of focus detection points in the specific region, and
each of the partial region and the specific region is within a photographing range.

18. A non-transitory computer-readable medium having stored thereon, computer-executable instructions which, when executed by a computer, cause the computer to execute operations, the operations comprising;
setting a density of a first plurality of focus detection points in a partial region, wherein
the density he first plurality of focus detection points in the partial region is higher than a density of a second plurality of focus detection points in a specific region,
the specific region is different from the partial region,
the density of the first plurality of focus detection points in the partial region corresponds to a distance between centers of the first plurality of focus detection points in the partial region,
the density of the second plurality of focus detection points in the specific region corresponds to a distance between centers of the second plurality of focus detection points in the specific region, and
each of the partial region and the specific region is within a photographing range.

* * * * *